United States Patent
Avvari et al.

(10) Patent No.: US 6,978,401 B2
(45) Date of Patent: Dec. 20, 2005

(54) SOFTWARE APPLICATION TEST COVERAGE ANALYZER

(75) Inventors: Madhava V. Avvari, Cupertino, CA (US); Philip A. Chin, San Jose, CA (US); Murali K. Nandigama, San Jose, CA (US); Uday S. Dhanikonda, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 618 days.

(21) Appl. No.: 10/211,097

(22) Filed: Aug. 1, 2002

(65) Prior Publication Data

US 2004/0025088 A1 Feb. 5, 2004

(51) Int. Cl.[7] ............................................... G06F 11/00
(52) U.S. Cl. ......................................... 714/38; 717/124
(58) Field of Search ........................... 714/38, 32, 33; 717/124, 130, 133

(56) References Cited

U.S. PATENT DOCUMENTS

| | | | |
|---|---|---|---|
| 4,853,851 A * | 8/1989 | Horsch .................... 714/38 |
| 5,050,168 A * | 9/1991 | Paterson .................. 714/35 |
| 5,345,450 A * | 9/1994 | Saw et al. ................ 714/741 |
| 5,754,760 A * | 5/1998 | Warfield .................. 714/38 |
| 6,314,558 B1 | 11/2001 | Angel et al. ............. 717/118 |
| 6,678,739 B1 * | 1/2004 | Muraoka .................. 709/247 |
| 6,701,514 B1 | 3/2004 | Haswell et al. .......... 717/115 |
| 6,715,108 B1 * | 3/2004 | Badger et al. ........... 714/38 |
| 6,850,252 B1 | 2/2005 | Hoffberg ................. 715/716 |
| 2003/0093716 A1 | 5/2003 | Farchi et al. ............ 714/34 |

* cited by examiner

*Primary Examiner*—Robert Beausoliel
*Assistant Examiner*—Gabriel Chu
(74) *Attorney, Agent, or Firm*—Martine Penilla & Gencarella LLP

(57) ABSTRACT

A method for analyzing test coverage of a software application is provided. The method includes profiling an executable of the software application to generate application call trees. The method also includes profiling test cases used to test a production Java VM so as to generate test case call trees. Also included is comparing the application call trees with the test case call trees so as to identify gaps in the application call tree not covered by the test case call trees.

27 Claims, 20 Drawing Sheets

SOFTWARE APPLICATION TEST COVERAGE ANALYZER

CLAIM OF PRIORITY FROM RELATED APPLICATIONS

This application claims 35 U.S.C. § 120 priority from each of U.S. patent application Ser. No. 10/142,226, filed May 8, 2002, and entitled "Software Development Test Case Analyzer and Optimizer" and U.S. patent application Ser. No. 10/143,620, filed May 8, 2002, and entitled "Software Development Test Case Maintenance," each of which is incorporated herein by reference.

BACKGROUND OF THE INVENTION

1. Field of the Invention

The present invention relates generally to software testing, and more particularly, to methods and systems for enhancing testing of computer software applications.

2. Description of the Related Art

As the use of computer software in performing daily tasks is increasing rapidly, assessing software reliability through software testing has become an imperative stage in the software development cycle. As is well known, software testing involves eliminating defects (i.e., bugs) in computer software, which if undetected, can create significant negative results.

By way of example, developing production Java virtual machine (VM) involves groups of developers, with different groups being responsible for creating and testing different portions of the production Java VM source code. Typically, the testing process involves execution of the software application by a plurality of test cases using the production Java VM, with each test case designed to ensure proper functionality of a particular section of the production Java VM. The testing process concludes when all test cases have been successfully executed. At this point, the production Java VM is considered to be bug-free and ready for sale to potential customers.

Unfortunately, customers may encounter a problem while executing a software application using the production Java VM. In certain scenarios, the problem may ultimately crash the production Java VM or the software application, halting the execution process. Thus far, production Java VM developers have not been able to easily determine whether the production Java VM or the software application is the source of the crash. Determining the source of the crash becomes even more exacerbating as locating the specific portion of the production Java VM or the software application causing the crash is a very difficult and time consuming task. By way of example, determining the source of the crash (i.e., production Java VM or the software application), determining the cause of the crash, or replicating the crash may take hours, days, or even weeks. In this manner, developers' time and computer resources are unnecessarily wasted, not to mention, significantly inconveniencing the customers.

In view of the foregoing, there is a need for a flexible methodology and system to improve test coverage of computer software applications.

SUMMARY OF THE INVENTION

Broadly speaking, the present invention optimizes test coverage analysis of a computer software application. In one embodiment, the extent of test coverage of the software application is optimized by creating test cases to test portions of the software application not tested. In one implementation, a coverage data of the software application is compared against the coverage data of a plurality of test cases previously implemented to test production Java virtual machine (VM), locating portions of the production Java VM not tested earlier. It should be appreciated that the present invention can be implemented in numerous ways, including as a process, an apparatus, a system, a device, or a method. Several inventive embodiments of the present invention are described below.

In one embodiment, a method for analyzing test coverage of a software application is provided. The method includes profiling an executable of the software application to generate application call trees. The method also includes profiling test cases used to test a production Java VM so as to generate test case call trees. Also included is comparing the application call trees with the test case call trees so as to identify gaps in the application call tree not covered by the test case call trees.

In another embodiment, a method for determining a source of an error during an execution of a software application using Java production VM is provided. The method includes profiling an executable of the software application to generate application call trees. Also included is profiling test cases used to test the production Java VM so as to generate test case call trees. The method further includes comparing the application call trees with the test case call trees so as to identify gaps in the application call trees not covered by the test case call trees. Also included are reproducing the application call tree and executing a reproduced application call tree using the production Java VM. The method further includes fixing the production Java VM so as to eliminate the error in the production Java VM if the error is generated during the execution of the reproduced software application using the production Java VM. Also included is confirming that the bug is not generated by the production Java VM if the execution of the production software component by the reproduced data structure does not generate the bug.

In yet another embodiment, a system for analyzing test coverage of a software application is provided. The system includes a production Java virtual machine (VM), a profiled Java VM, a plurality of test cases, a software application executable, a database, and a compare module. The plurality of test cases is used to test the production Java VM and is executed using the profiled Java VM so as to generate test coverage data. The software application executable is executed using the production Java VM so as to generate an application coverage data. The database is configured to store the test coverage data and the application coverage data. The compare module is configured to compare the test coverage data against the application coverage data so as to locate a gap in the application coverage data.

In still another embodiment, a method for determining a source of a bug generated while a software application is executed using a production Java VM is provided. The method includes providing a production Java VM, providing a profiled Java VM, and providing a plurality of test cases configured to be executed using the production Java VM. The method further includes receiving an application executable. Also included are executing the test cases using the profiled Java VM so as to generate test coverage data and storing test coverage data in a database. Also included are executing the application executable using the profiled Java VM so as to generate an application coverage data and storing the application coverage data in the database. The method further includes using test coverage data to reproduce the application coverage data and executing a reproduced application coverage data using the production Java VM. Also included is updating the production Java VM so as to eliminate the bug in the production Java VM, if the bug is generated while executing the test cases generating the reproduced application coverage data using the production Java VM. Also included is confirming that the production Java VM does not generate the bug, if the execution of the production Java VM by the test cases generating the reproduced application coverage data does not generate the bug.

In yet another embodiment, a method for analyzing a test coverage of a software application being executed using a production Java VM is provided. The method includes providing a profiled Java VM, providing a plurality of test cases being executed using the production Java VM, and providing an application executable. Also included are executing the test cases using the profiled Java VM so as to generate test coverage data and storing test coverage data in a database in a call tree format. Further included is executing the application executable using the profiled Java VM so as to generate an application coverage data. The method further includes storing the application coverage data in the database in the call tree format and comparing an application call tree with the test call trees. The method also includes locating a path in the application call tree not having been traversed by the test call trees so as to provide coverage for all paths in the application call tree.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

Figure 1:
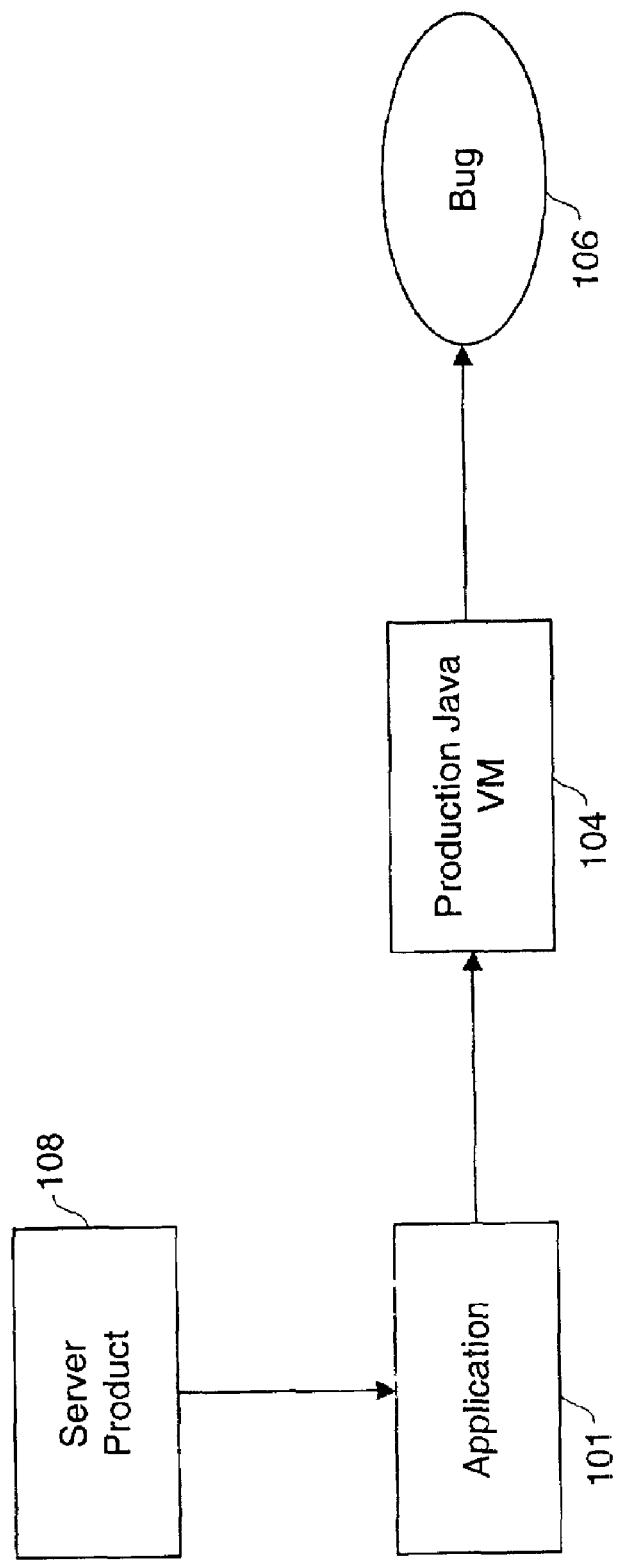
FIG. 1 is a simplified schematic diagram depicting an application crashing during execution of a production Java VM, in accordance with one embodiment of the present invention.

Inventions for optimizing test coverage analysis of a computer software application are provided. In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

In one embodiment, a plurality of test cases in a plurality of test suites is used to test production Java™ virtual machine (VM). In doing so, the test cases are executed using a profiled Java VM, creating test coverage data (herein also referred to as test call tree), which in one example is in the format of a call tree. The test coverage data is stored in a database as test data structures using a database updater. The application executable of an application is likewise executed using the profiled Java VM, creating an application coverage data. The application coverage data (herein also referred to as application call tree) is stored as an application data structure in the database.

According to one embodiment, the application data structure (herein also referred to as application call tree) is mimicked using the test data structures (herein also referred to as test case call trees). That is, the paths of the application call tree are reproduced/replicated using the paths of the test call trees. In one example, a compare engine is used to compare the application data structure with the test data structures to determine whether the application data structure can be reproduced without creating new test cases. That is, whether all paths in the application call tree is covered with the paths in the test call trees. If certain gaps exist in covering particular paths of the application call tree, new test cases are created to cover the gaps. Thereafter, the new test cases are executed using the production Java VM to reproduce the crash. If the production Java VM crashes, the production Java VM is fixed and a new version of the production Java VM is provided to the customer.

However, if executing the new test cases using the production Java VM does not cause the production Java VM to crash, an attempt is made to reproduce the application call tree. To achieve this task, a selected ones of the plurality of test cases (i.e., existing test cases as well as the newly added test cases) is used to run the production Java VM. The call trees of the selected number of test cases are configured to traverse the same path as the application call tree. However, the test cases may not traverse the application path in the exact order. If the production Java VM crashes, the production Java VM is fixed and a new version the production Java VM is provided to the customers.

Otherwise, the application call tree is replicated in the exact order. To achieve this task, certain test cases may need to be modified and stored in the database so that the exact paths can be replicated. Once the exact paths have been replicated, the modified test cases and a number of existing test cases executed using the production Java VM, in an order configured to replicate the application call tree. If the production Java VM crashes, the source of the bug is discovered, the production Java is fixed and a new version the production Java VM is provided to the customer. Otherwise, the application is returned to the customer, as the source of the bug is not the production Java VM. The bug may be caused by a problem in the application or an external component interfacing with the application.

As one embodiment of the present invention implements the Java™ (hereinafter "Java") programming language, an overview of Java is provided below. In operation, a user of a typical Java based system interacts with an application layer of a system generally written by a third party developer. The application layer generally provides the user interface for the system. A Java module is used to process commands received by the application layer. A Java virtual machine is used as an interpreter to provide portability to Java applications. In general, developers design Java applications as hardware independent software modules, which are executed Java virtual machines. The Java virtual machine layer is developed to operate in conjunction with the native operating system of a particular hardware, which represents the physical hardware on which the system operates or runs. In this manner, Java applications can be ported from one hardware device to another without requiring updating of the application code.

Unlike most programming languages, in which a program is compiled into machine-dependent, executable program code, Java classes are compiled into machine independent byte code class files which are executed by a machine-dependent virtual machine. The virtual machine provides a level of abstraction between the machine independence of the byte code classes and the machine-dependent instruction set of the underlying computer hardware. A class loader is responsible for loading the byte code class files as needed, and an interpreter or just-in-time compiler provides for the transformation of byte codes into machine code.

More specifically, Java is a programming language designed to generate applications that can run on all hardware platforms, small, medium and large, without modification. Developed by Sun, Java has been promoted and geared heavily for the Web, both for public Web sites and Intranets. Generally, Java programs can be called from within HTML documents or launched standalone. When a Java program runs from a Web page, it is called a "Java applet," and when run on a Web server, the application is called a "servlet."

Java is an interpreted language. The source code of a Java program is compiled into an intermediate language called "byte code". The byte code is then converted (interpreted) into machine code at runtime. Upon finding a Java applet, the Web browser invokes a Java interpreter (Java Virtual Machine), which translates the byte code into machine code and runs it. Thus, Java programs are not dependent on any specific hardware and will run in any computer with the Java Virtual Machine software. On the server side, Java programs can also be compiled into machine language for faster performance. However a compiled Java program loses hardware independence as a result.

Keeping this brief overview to Java in mind, reference is now made to a simplified block diagram of FIG. 1 depicting generation of a bug 106 during the execution an application 101 using a production Java VM 104 by, in accordance with one embodiment of the present invention. As shown, having encountered a problem while being executed using the production Java VM 104, the application 101 has crashed and reported the existence of a bug 106. At this point, however, it cannot be determined whether the source of the bug 106 is the application 101 or the production Java VM 104. The application 101 is shown to have been exposed to effects of an external component, such as server product 108. Additional detail with respect to the execution of production Java VM 104 by the application is provided below.

In one embodiment, the application 101 may be any software application created by a third party and designed to execute production Java VM 104. The production Java VM developed by developers at Sun Microsystems, Inc., of Palo Alto, Calif. The production Java VM 104 may be downloaded by the customers from Sun Microsystems, Inc. website over the Internet. The production Java VM 104, as designed by Sun Microsystems, Inc., is to be implemented by the customers to execute any software application (e.g., application 101).

Figure 2:
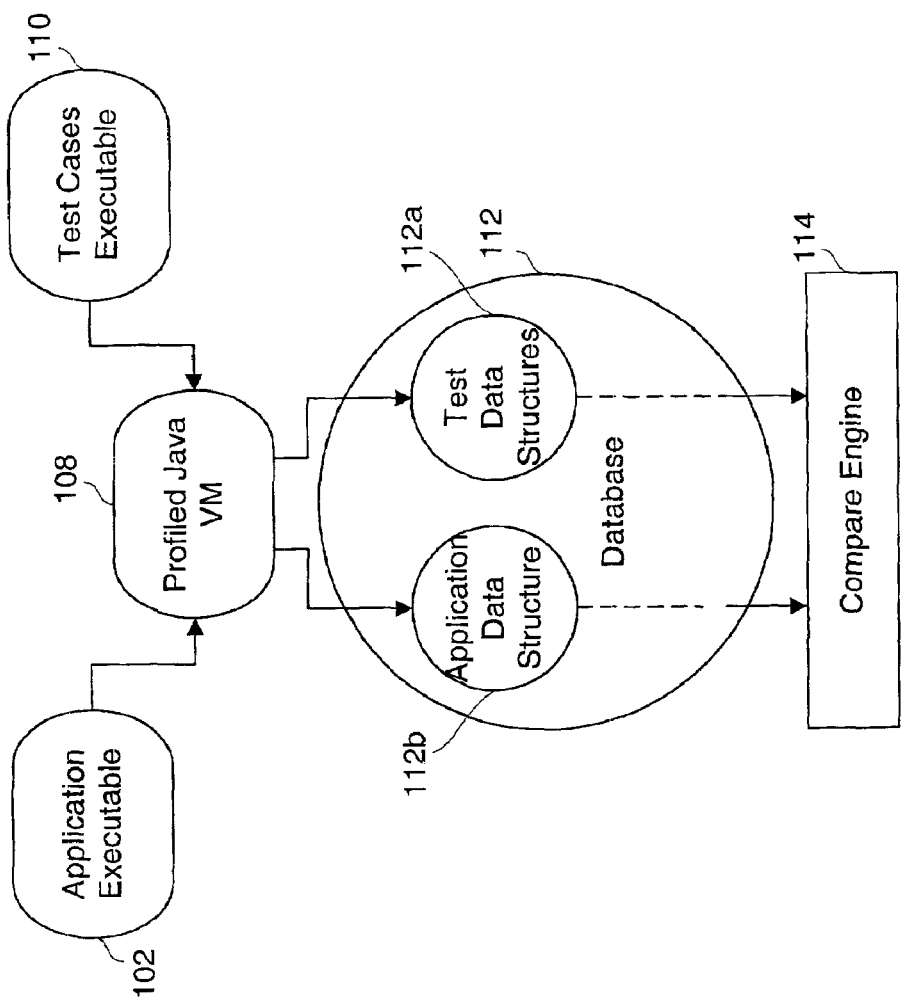
FIG. 2 is a simplified block diagram depicts comparing of test data structures of a plurality of test cases with the application data structure of an application to extent of test coverage of the production Java VM by, in accordance with another embodiment of the present invention.

In accordance with one embodiment, as shown in the simplified block diagram of FIG. 2, a test coverage of production Java VM 104 is determined by comparing the test data structures of a plurality of test cases with the application data structure of the application 101. As shown, a plurality of test cases 110 are shown to have run on profiled Java VM 108 generating test data structures 112a stored in a database 112. In a like manner, an application executable 102 (i.e., the executable of the application 101) is also shown to have been executed using the profiled Java VM 108 generating an application data structure 112b also stored in the database 112. The test data structures 112a and the application data structure 112b are shown to have been fed to a compare engine 114 designed to compare the test data structures 112a and the application data structure 112b.

One of ordinary skill in the art must appreciate that the test data structures 112a resulting from running of all test cases executables 110 using the profiled Java VM can be represented in different formats (e.g., branch profile format herein also referred to as call tree format, etc.). Similarly, the application data structure 112b resulting from the execution of the application execute 102 using the profiled Java VM can also be represented in different formats (e.g., branch profile format herein also referred to as call tree format, etc.). Additionally, in one example, the test data structures 112a and the application data structure 112b can be stored in the database in any suitable data structure (e.g., tables, etc.).

By way of example, where the test data structures 112a and the application data structure 112b are represented in the call tree format, the compare engine 114 compares the former and the latter so as to determine whether any portion of the application executable has not been tested (i.e., whether any gaps exists). That is, whether any of the functions or methods defined in the application executable 102 has not been tested by any of the test cases (i.e., such methods or functions do not have any existing entries in any of the call trees for any of test cases). As will be discussed in more detail below, the bug 106 causing the application executable 102 to crash may be reproducible in-house by Sun Microsystems' developers if production Java VM 108 is the source of the bug 106. However, in certain scenarios, the bug cannot be reproduced by production Java VM developers, as the cause of the crash may be the application executable 102 or certain contributory external factors (e.g., server product, etc.).

Figure 3:
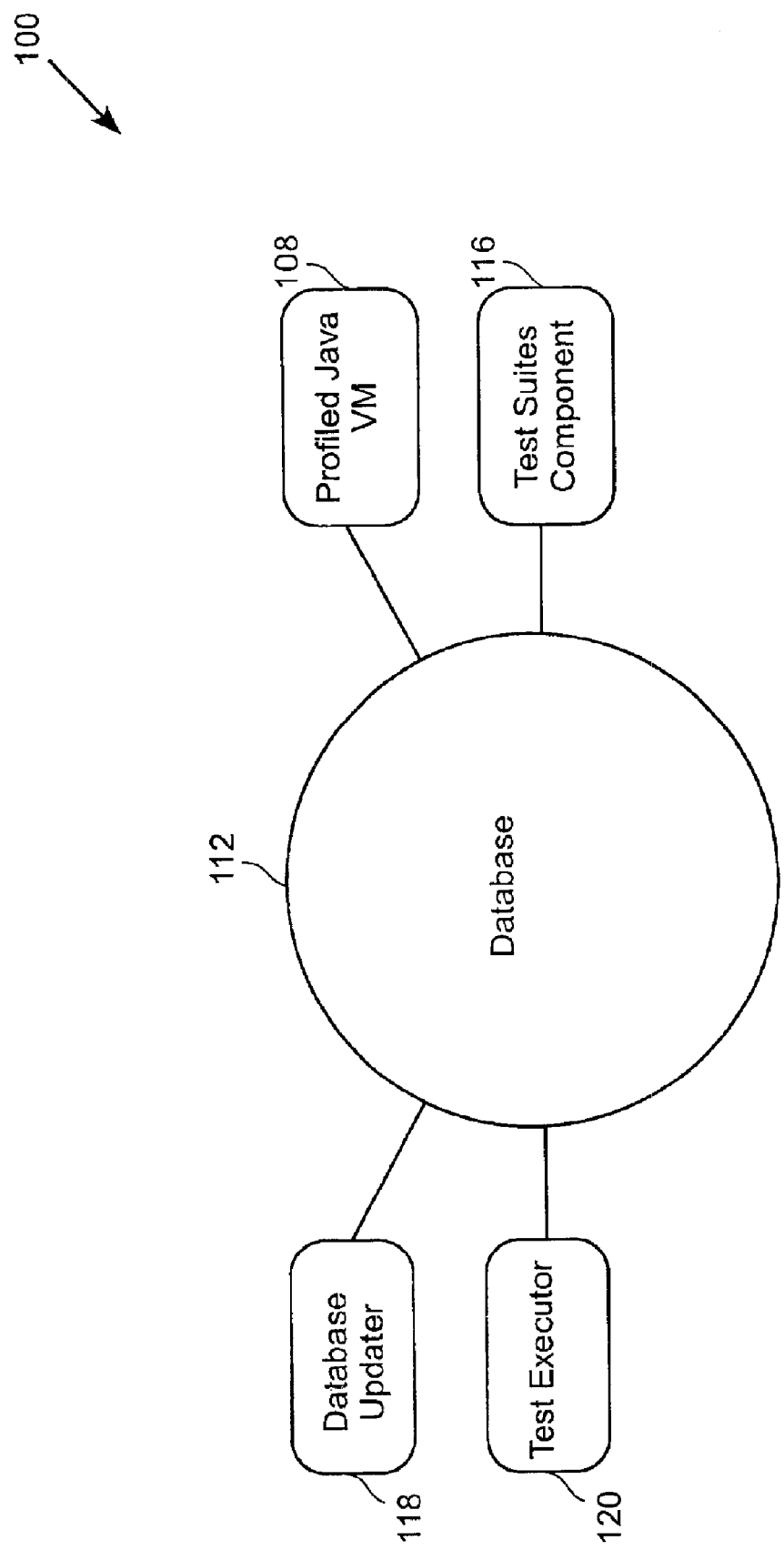
FIG. 3 is a simplified schematic diagram depicting the collection of test data generated during testing of profiled Java VM, in accordance with another embodiment of the present invention.

FIG. 3 is a simplified block diagram depicting collection of test data generated during execution of test cases using the profiled Java VM 108, in accordance with one embodiment of the present invention. As shown, in one example, the profiled Java VM 108 is used to test a plurality of test cases in the test suites component 116, so as to ensure proper functionality of the profiled Java VM 108. Thereafter, the production Java VM 104 can be provided to the potential customers. In one example, all test cases in all of the test suites defined in the test suites component 110 are executed by a test executor 120 using the profiled Java VM 108, creating test coverage data. In one instance, the profiled Java VM 108 is the Java binary profile written by the developers for in-house use.

In one embodiment, a database updater 118 is used to interface with the database 112. As the interface, the database updater 118 stores the test coverage data as test data structures in the database 112. In one example, the test coverage data generated by executing all the test cases using the profiled Java VM 108 may be represented in different formats (e.g., branch profile format herein also referred to as call tree format, etc.). As will be discussed in more detail below, the test coverage data reveals all dependencies between the functions/methods of different test cases in different test suites.

Figure 4:
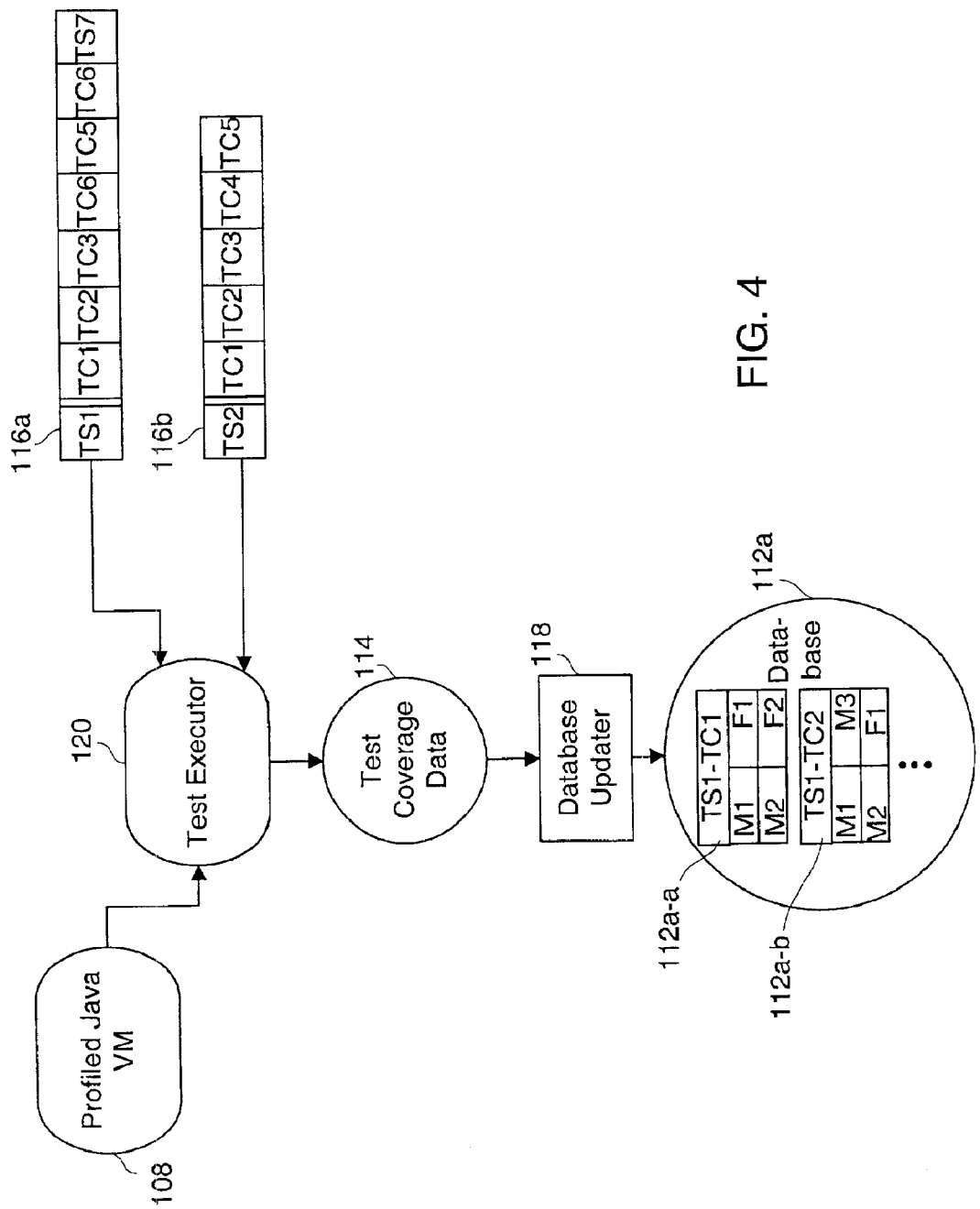
FIG. 4 is a simplified block diagram illustrating the storing of test coverage data in a database as test data structures, in accordance to yet another embodiment of the present invention.

In accordance with one embodiment of the present invention, FIG. 4 illustrates storing of test coverage data 114 as test data structures 112a in database 112a. In one instance, the test executor 120 uses the profiled Java VM 108 (i.e., profiled Java executable) to run test cases TC1–TC7 of a test suite 116a and test cases TC1–TC5 of a test suite 116b, creating the test coverage data 114. The test coverage data 114 is raw profiled coverage data, which in one embodiment has the format of a call tree. The test coverage data 114 is then saved in the database 112 as test data structures 112a using the interface, database updater 118. As shown, a plurality of exemplary test data structures 112a-a and 112a-b are shown to include the test coverage data 114 for test cases TC1 and TC2 of the test suite 116a. In one instance, the test data structures 112a-a and 112a-b are configured to be tables. As shown, the table 112a-a includes methods M1 and M2 and functions F1 and F2 while the table 112a-b includes methods M1–M3 and function F1.

Figure 5:
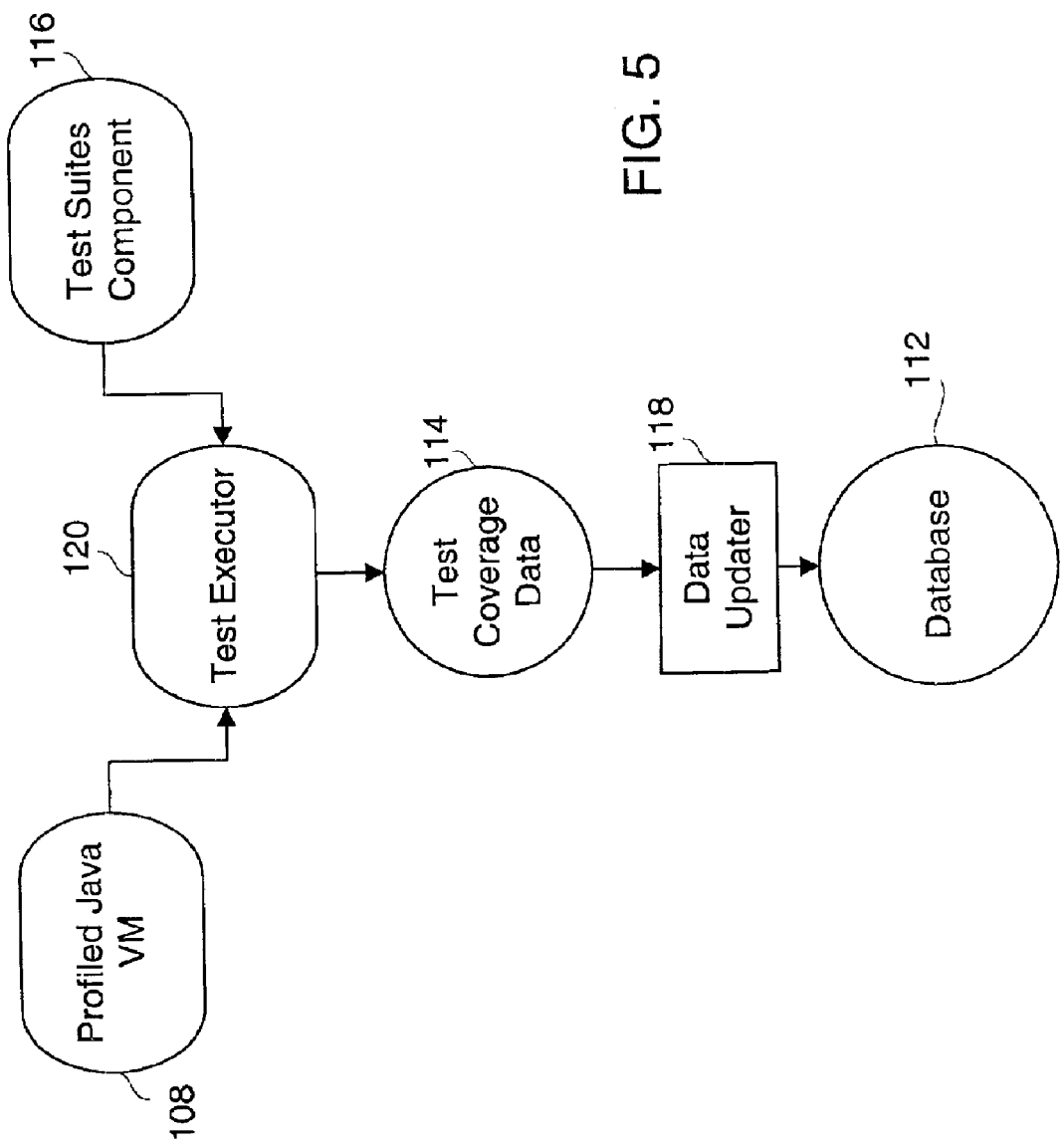
FIG. 5 is a simplified block diagram illustrating the collection of test data structures, in accordance with yet another embodiment of the present invention.

Reference is made to the simplified block diagram of FIG. 5 depicting collection of test data structures, in accordance with one embodiment of the present invention. The test suites defined in the test suites component 116 are shown to be executed by the test executor 120 using the profiled Java VM, creating the test coverage data 114. In one example, the profiled Java VM 108 includes a plurality of special codes, which when activated, causes generation of certain information (e.g., flags, etc.). For instance, the profiled Java VM 108 may be a software code defined in the compiler of the computer system running the test suites or the application executable 102. The profiled Java VM 108 is written such that when the test suites component 116 run the profiled Java VM 108, the compiler is designed to insert a plurality of documented and hidden flags into the test suites source code. For instance, were the call tree profile format is used, the hidden flags included in the test coverage data 114 can be used to traverse the paths of the methods and functions (i.e., can be traversed so as to determine the functions/methods called by a specific function/method in the source code).

In one embodiment, the test coverage data 114 illustrates the extent of the coverage of methods/functions of the Profiled Java VM 108 by each of the test cases. For instance, as discussed earlier, the test coverage data may be generated in the form of the call tree. Thus, the test coverage data can be generated in any appropriate format (e.g., branch profile format, code coverage profile format, etc.) based on a type of profiling method used. The test coverage data 114 is then saved in the database 112 using the interface data updater 116.

In one example, the test coverage data may be stored in the database 112 in a data structure in the form of the table. However, in another embodiment, the test coverage data 112 may be stored in the database 112 in any appropriate data structure (e.g., linked lists, binary trees, key equal value pairs, etc.). Furthermore, the database 112 can be configured to be any appropriate database (e.g., relational database, SleepCat database, etc.). Additionally, the database engine can be any suitable database engine (e.g., Oracle 9i, SleepyCat, Open LDAP, etc.).

Figure 6:
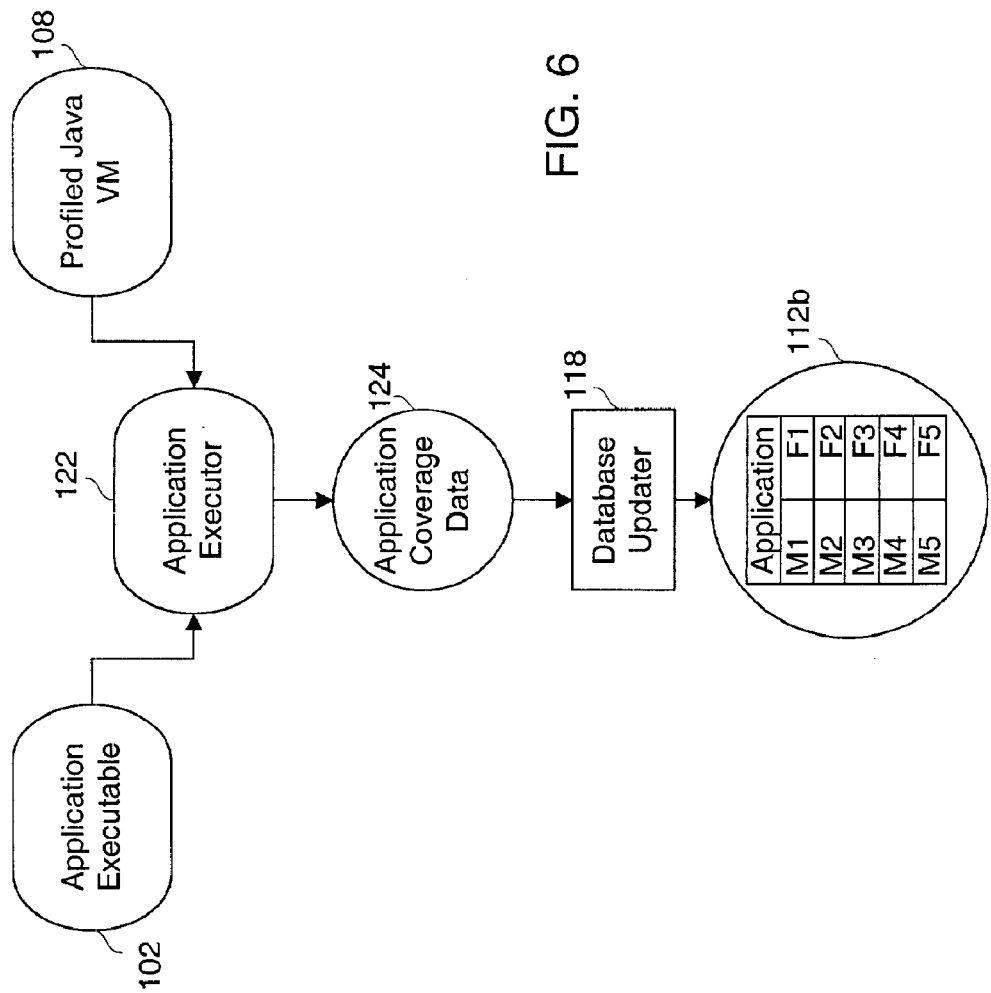
FIG. 6 is a simplified block diagram illustrating the creation and storing of an application data structure in the database, in accordance with yet another embodiment of the present invention.

FIG. 6 is a simplified block diagram depicting creation and storing of an application data structure 112b in the database 112, in accordance with one embodiment of the present invention. An application executor 122 is shown to execute the application executable 102 of the application using the profiled Java VM 108, creating the application coverage data 124. In one example, depending on the required format, the application coverage data 124 may be in the format of a call tree. In one implementation, the profiled Java VM 108 is written such that when the application executable 102 is run using the profiled Java VM 108, the compiler inserts a plurality of documented and hidden flags into the application executable 102 source code. In one example, the database updater 118 stores the application coverage data 124 as application data structure 112b in the database 112. In this manner, the call tree for application executable 102 is generated and stored in the database 112, enabling the profiled Java VM 108 developers to mimic the behavior of the application executable 102 using the call trees for the test cases.

Figure 7A:
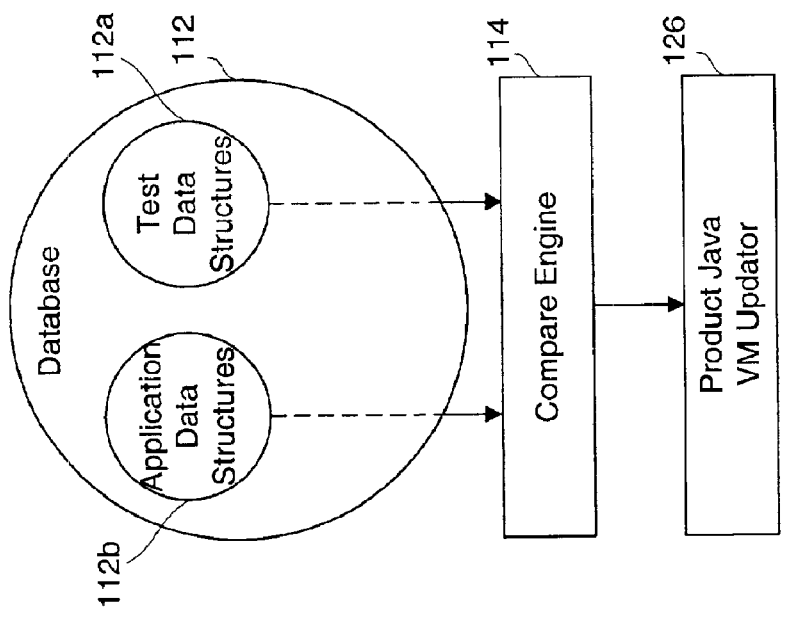
FIG. 7A is a simplified block diagram depicting mimicking the behavior of the application executable by using test case call trees, in accordance to yet another embodiment of the present invention.

Reference is made to FIG. 7A depicting the capability of the embodiments of the present invention to mimic the behavior of the application executable implementing the test call trees, in accordance with one embodiment of the present invention. As shown, test data structures 112a and application data structure 112a stored in the database 112 are fed to the compare engine 114. Using the test data structures 112a and the application data structure 112a, the compare engine 114 attempts to mimic the behavior of the application executable 102. In one example, this task is achieved by reproducing or replicating the application data structure 112b using the test data structures 112a and thereafter executing the test cases generating the replicated application call tree using the production Java VM 104. If the execution of the test cases generating the replicated application call tree using the production Java VM 104 causes the production Java VM 104 to crash, the behavior of the application executable 102 is replicated. At this point, the bug 106 in the production Java VM 104 can be resolved, and the production Java VM 104 can be updated using the production Java updater 126.

As will be explained in more detail below, determining the cause of the crash as associated with the production Java VM 104 by mimicking the behavior of the application executable 102 is performed by the compare engine 114 using the test data structures (herein also referred to as test call trees) 112a and application data structure 112 (herein also referred to as application call trees). In one example, the compare engine 114 determines whether the behavior of the application executable 102 can be replicated using the existing test data structures 112a. That is, whether all paths traversed in the application data structure 112b can be traversed by paths in the test data structures 112a. If such determination is made, the production Java VM 104 is run using the existing test data structures 112a. However, if certain paths in the application data structure 112b cannot be located in the test data structures 112a, new test cases may need to be developed to cover any portion of the production Java VM 104 not previously covered by any test cases (i.e., any gaps). Additional detail with regard to the functions of the compare engine 114 is provided below.

Figure 7B:
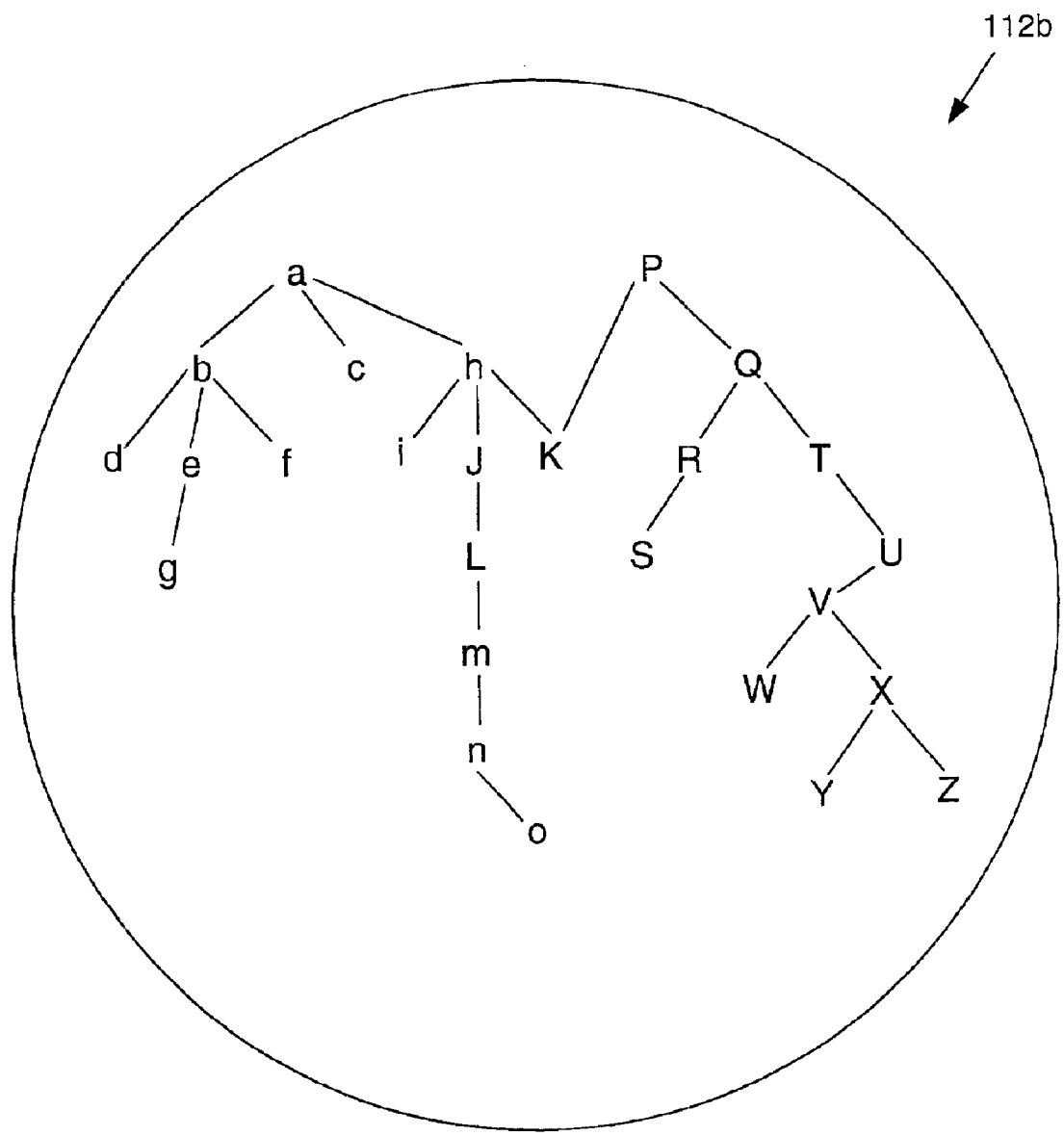
FIG. 7B depicts a call tree format of the application data structure, in accordance to still another embodiment of the present invention.
Figure 7C:
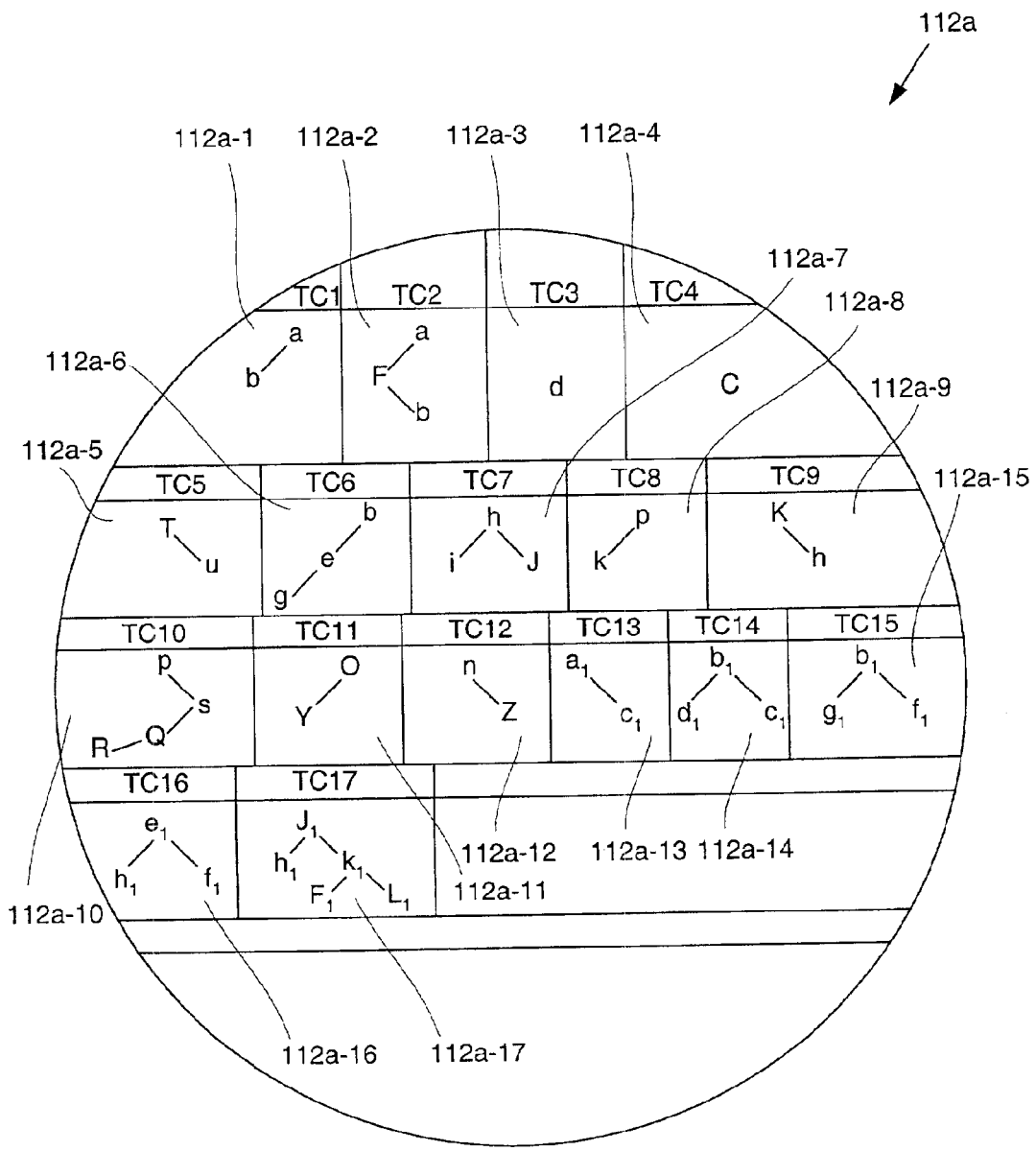
FIG. 7C depicts a call tree format of the test data structures, in accordance to still another embodiment of the present invention.

A call tree format of the application data structure 112b and test data structures 112a of the present invention can further be understood in reference to FIGS. 7B and 7C, respectively, in accordance with one embodiment of the present invention. As shown, the application data structure 112b is a complex hierarchical call tree including a plurality of functions and methods "a" through "z." In comparison, the test data structures 112a includes a plurality of test cases TC1 through TC17, corresponding to test call trees 112a-1 through 112a-17. In one example, the application data structure 112b and the test data structures 112a are stored in the database 112 in the form of tables. As illustrated, paths covered by the plurality of test data structures 112a-13 through 112a-17 are not covered by the application data structure 112b.

Figure 8A:
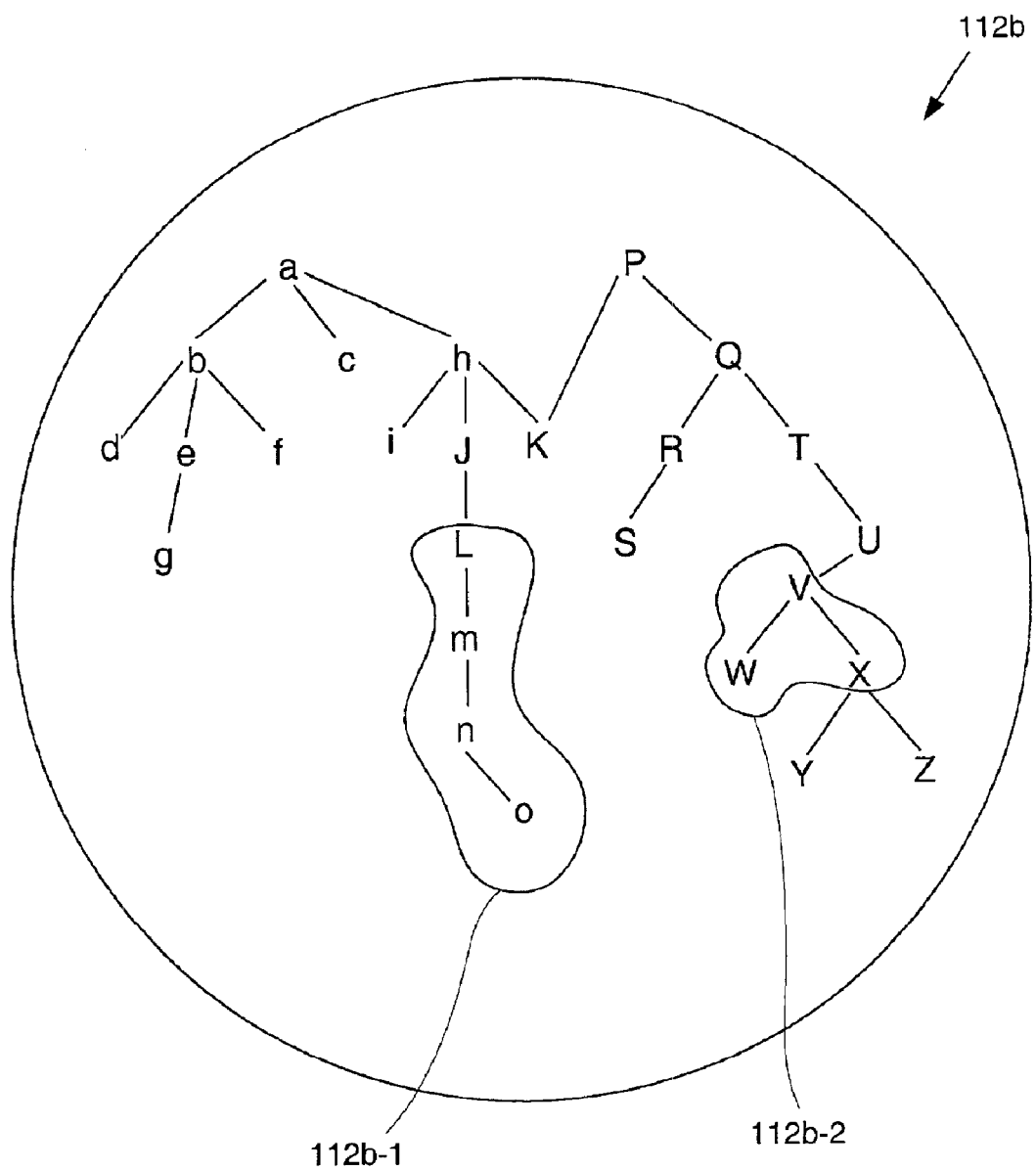
FIG. 8A depicts portions of the application data structure not traversed by any of the test cases in the test data structures, in accordance to still another embodiment of the present invention.
Figure 8B:
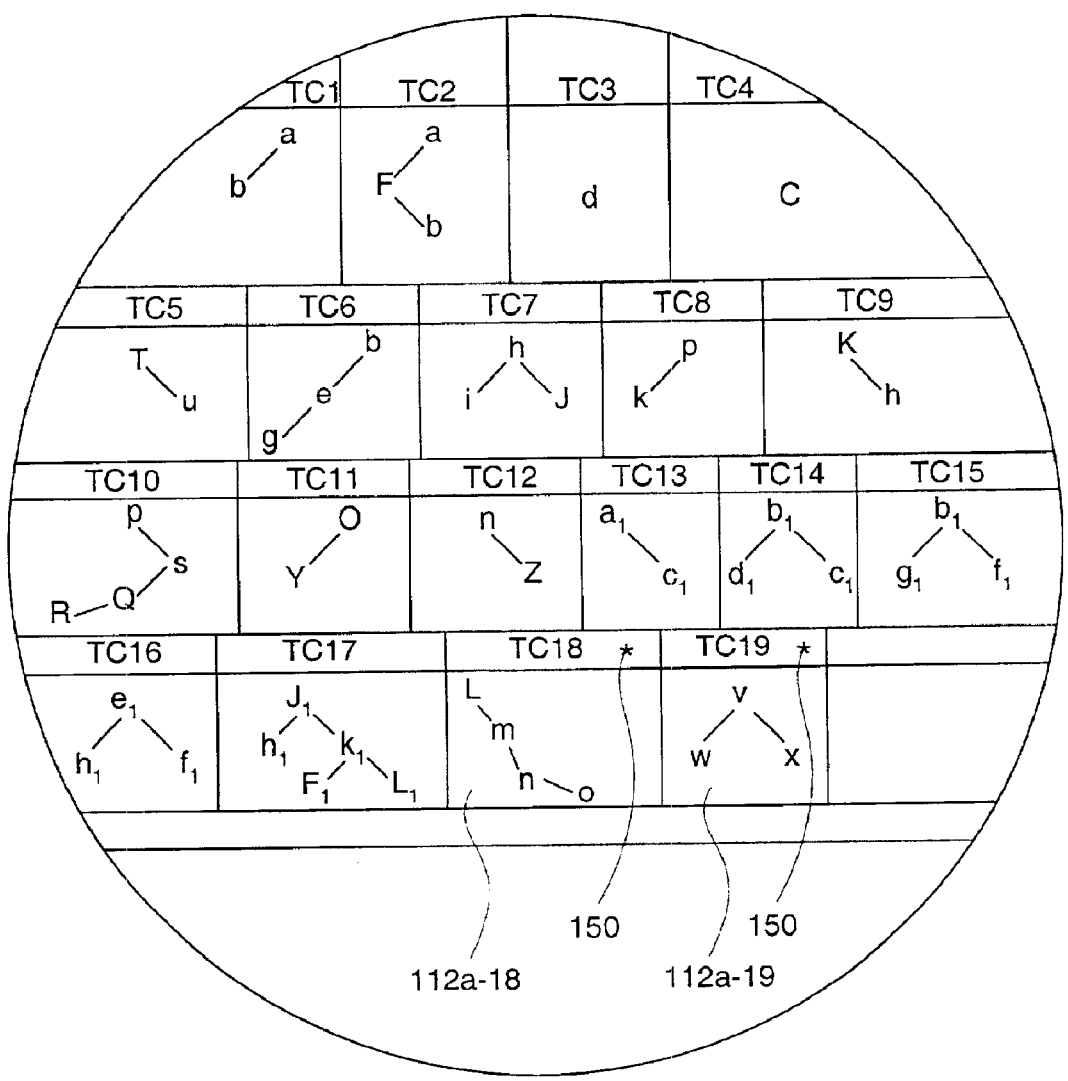
FIG. 8B depicts the addition of a plurality of test cases to cover the gaps in the application data structures, in the test suites component, thus the test data structures, in accordance to still another embodiment of the present invention.
Figure 8C:
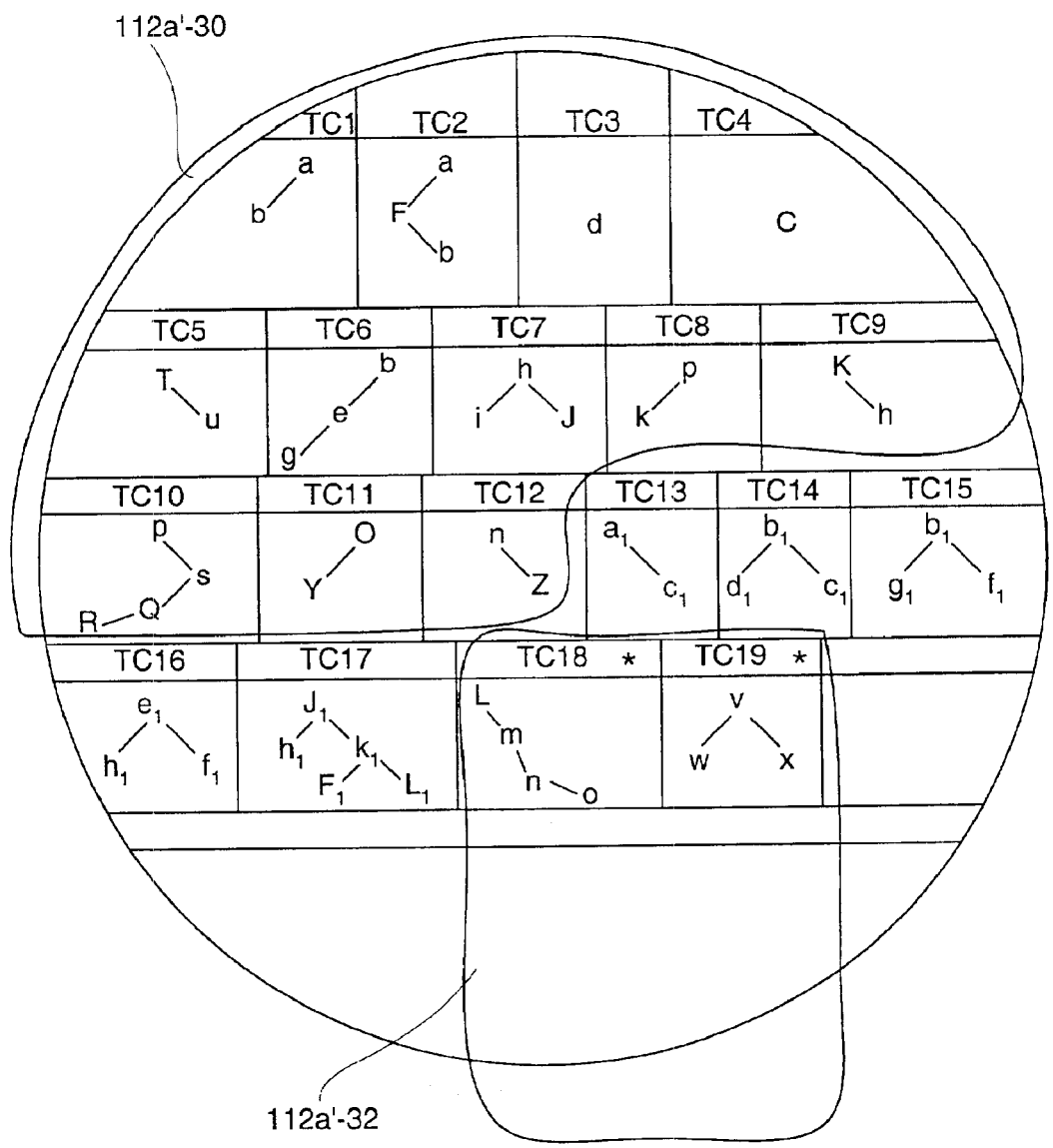
FIG. 8C depicts reproducing of the application data structure using a selected number of the plurality of test cases, in accordance to still another embodiment of the present invention.
Figure 8D:
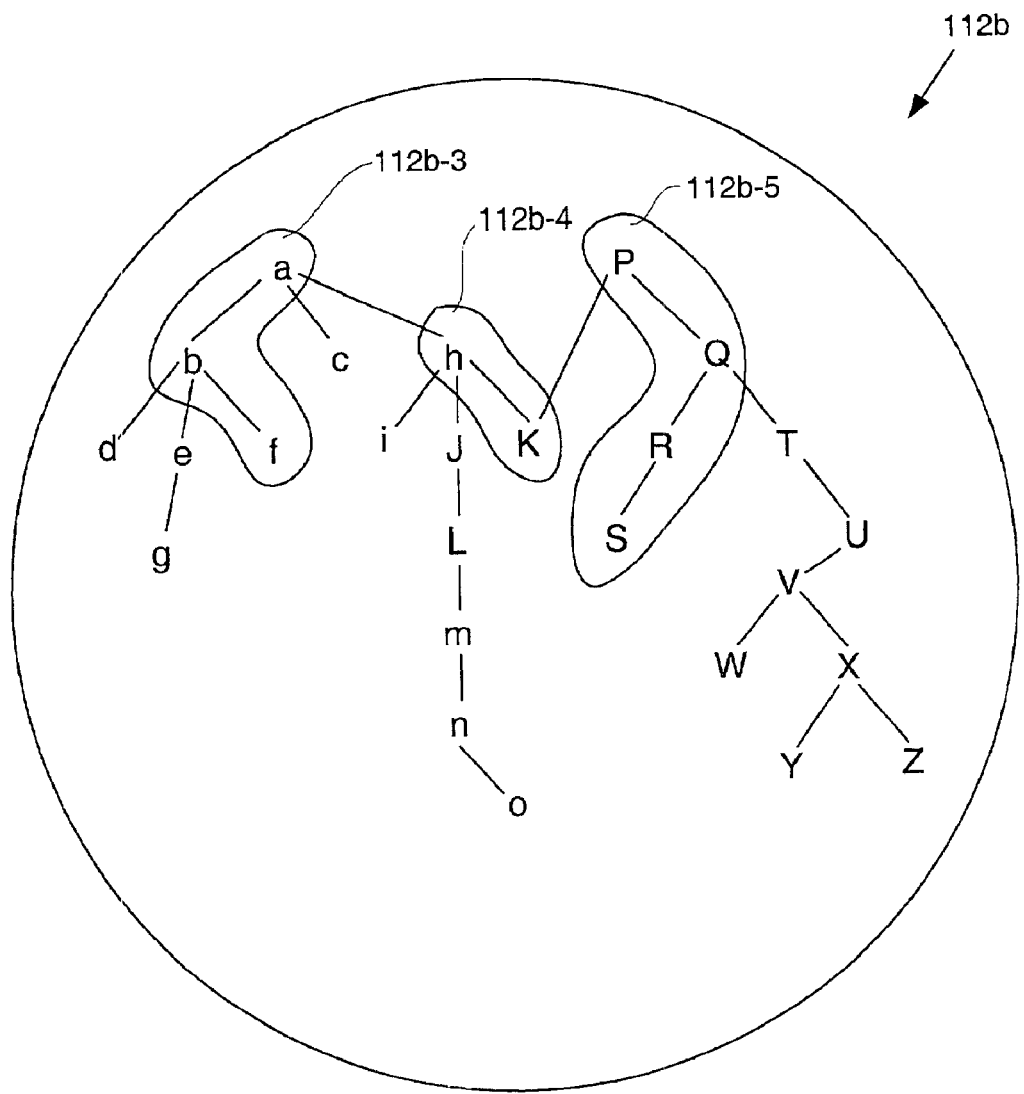
FIG. 8D depicts certain paths in the application data structure not exactly traversed by any of the test data structures, however not in the exact order, in accordance to still another embodiment of the present invention.

FIGS. 8A and 8B illustrate the compare engine 114 locating any of the functions/methods in the application data structure 112b that were not tested earlier by any of the test data structures 112a, in accordance with one embodiment of the present invention. In one example, a comparison of the application data structure 112b of FIG. 8A with the test data structures 112a shown in FIG. 7B, reveals that certain functions/methods implemented in the application data structure 112b have not been tested by any of the test cases in the test data structures 112a. In the embodiment of FIG. 8A, functions/methods 1, m, n, and o, as identified by a first gap 112b-1 and functions/methods v, and x, and w, as identified by a second gap 112b-2, were not previously tested, as their paths have not been traversed by any of the test case call trees. Consequently, a plurality of new test cases is created to cover the functions/methods in the first and second gaps 112b-1 and 112b-2.

Referring to FIG. 8B, two new test cases, TC18 and TC19, having corresponding test call trees 112a-18 and 112a-19, have been added to the plurality of test cases in the test suites component 116a. The newly added test call trees 112a-18 and 112a-19 are shown to have been marked by asterisk 150. As shown, the test case TC18 having the test call tree 112a-18 has been created to test the functions/methods in the first gap 112b-1 while the test case TC19 having the test call tree 112a-19 is shown to have been created to test the functions/methods in the second gap 112b-2.

In one embodiment, the newly created test cases TC18 and TC19 are executed using the production Java VM 104. In one example, the newly created test cases TC18 and TC19 are run using the production Java VM 104, causing the production Java VM 104 to crash. In such situation, the production Java VM 104 developers learn that the source of the crash is the production Java VM 104. In response, the production Java VM 104 is fixed so as to eliminate the problem and the customer is provided with a new bug-free version of the production Java VM 104.

In a different embodiment, wherein using the production Java VM 104 to execute the newly added test cases TC18 and TC19 does not cause the production Java VM to crash, the newly created test cases TC18 and TC19 are executed using the profiled Java VM 108, creating new test coverage data. The new test coverage data is then fed to the database updater 116, crating new test data structures that are used to update the existing test data structures (i.e., test call trees). This is shown in FIG. 8B, in which the two new test cases, TC18 and TC19 are shown to respectively have test call trees 112a-18 and 112a-19. The newly added test call trees 112a-18 and 112a-19 are shown to have been marked by asterisk 150, for ease of reference. As illustrated, the test case TC18 having the test call tree 112a-18 covers the functions/methods in the first gap 112b-1 while the test case TC19 is shown to test the functions/methods in the second gap 112b-2.

In certain situations, creating new test cases and executing the production Java VM using the new test cases do not reveal the source of the crash. In such scenarios, the compare engine 114 proceeds to reproducing or replicating the application data structure 112b using a selected number of the plurality of test cases TC1–TC13, TC18, and TC19, as illustrated in the embodiments of FIGS. 8C and 8D–8F, in accordance with one embodiment of the present invention. As shown, test cases TC1–TC12, as identified by 112a'-30, and TC18 and TC19, as identified by 112a'-32, have been selected to reproduce the application data structure 112b. By way of example, a combination of the test cases TC1–TC12, TC18, and TC19 is configured to reproduce the application data structure 112*b*. However, the functions/methods in the reproduced application data structure may not be called in the same order as the functions/methods in the application data structure 112*b*. Nevertheless, the reproduced application data structure includes each and every path identified by the application data structure 112*b*.

The test cases generating the reproduced application data structure are executed using the production Java VM, so as to determine the cause of crash. If the test cases generating the reproduced application data structure causes the production Java VM 104 to crash, the production Java VM 104 is recognized as the source of the problem. At this point, the production Java VM 104 is fixed and updated and the customer is provided with a bug-free version of the production Java VM 104.

In the alternative, if the execution of the test cases generating the reproduced application data structure do not cause the production Java VM 104 to crash, the compare engine 114 is configured to exactly replicate application data structure 112*b*. In doing so, the compare engine 114 can modify a selected number of test cases so as to arrive at modified test cases which if combined, would exactly replicate the application data structure. Otherwise, a test case exactly replicating the application test case may be created so as to find the source of the crash.

Figure 8E:
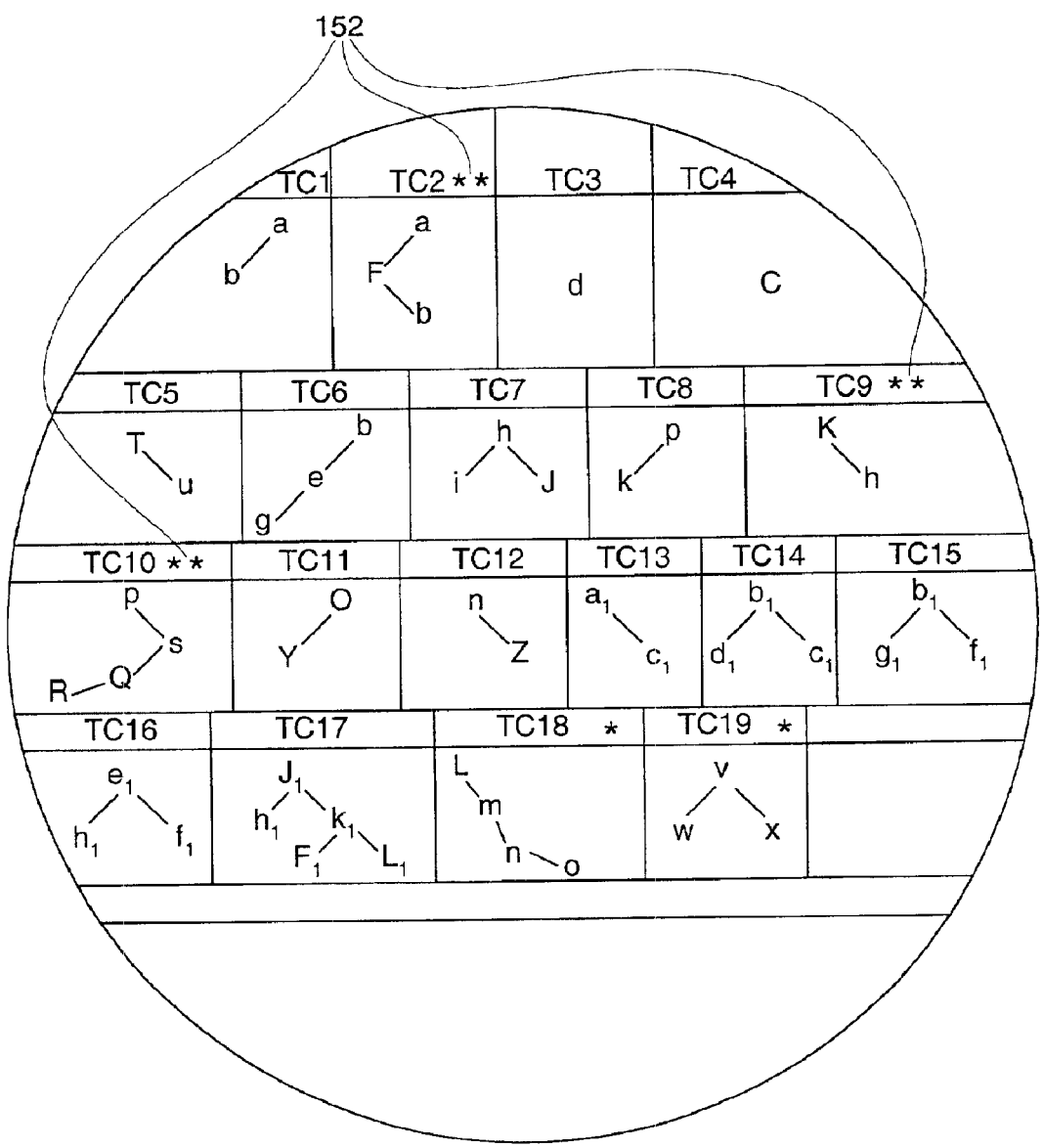
FIG. 8E depicts a plurality of test cases to some extent traversing the same path as the marked paths of the application data structures, in accordance to still another embodiment of the present invention.

By way of example, FIG. 8E is an illustration of such scenario. As shown, a plurality of application paths 112*b*-3, 112*b*-4, and 112*b*-5 in the application data structure 112*b* have not exactly been followed by any of the existing test cases TC1 through TC19, in accordance with one embodiment of the present invention. For instance, the test cases TC2, TC9, and TC10, as marked by two asterisks 152 in FIG. 8E, for ease of reference, are shown to follow the same paths as the application paths 112*b*-3, 112*b*-4, and 112*b*-5, to some extent. However, a close examination of the test call trees 112*a*-2, 112*b*-9, and 112*b*-10 of the test cases TC2, TC9, and TC10 reveals that the exact order of execution of the methods/functions in the test cases TC2, TC9, and TC10 differs from the order of execution of the plurality of application paths 112*b*-3, 112*b*-4, and 112*b*-5. Thus, a plurality of modified test cases TC20–TC22 is created. The paths in the modified test cases TC20–TC22 are the modified paths of the methods/functions in the test cases TC2, TC9, and TC10, replicating the exact execution order of the application paths 112*b*-3, 112*b*-4, and 112*b*-5. At this point, selected test cases from the modified test cases which order of execution exactly matches the order of execution of the application call tree, the new test cases, and the existing test cases are used to execute application executable 102 using the production Java VM 104. If using the production Java VM 104 to execute the application executable 102 generates a bug, it becomes apparent that the production Java VM 104 is the source of the problem. The production Java VM 104 is then fixed and updated and the customer is provided with a bug-free version of the production Java VM 104.

Figure 8F:
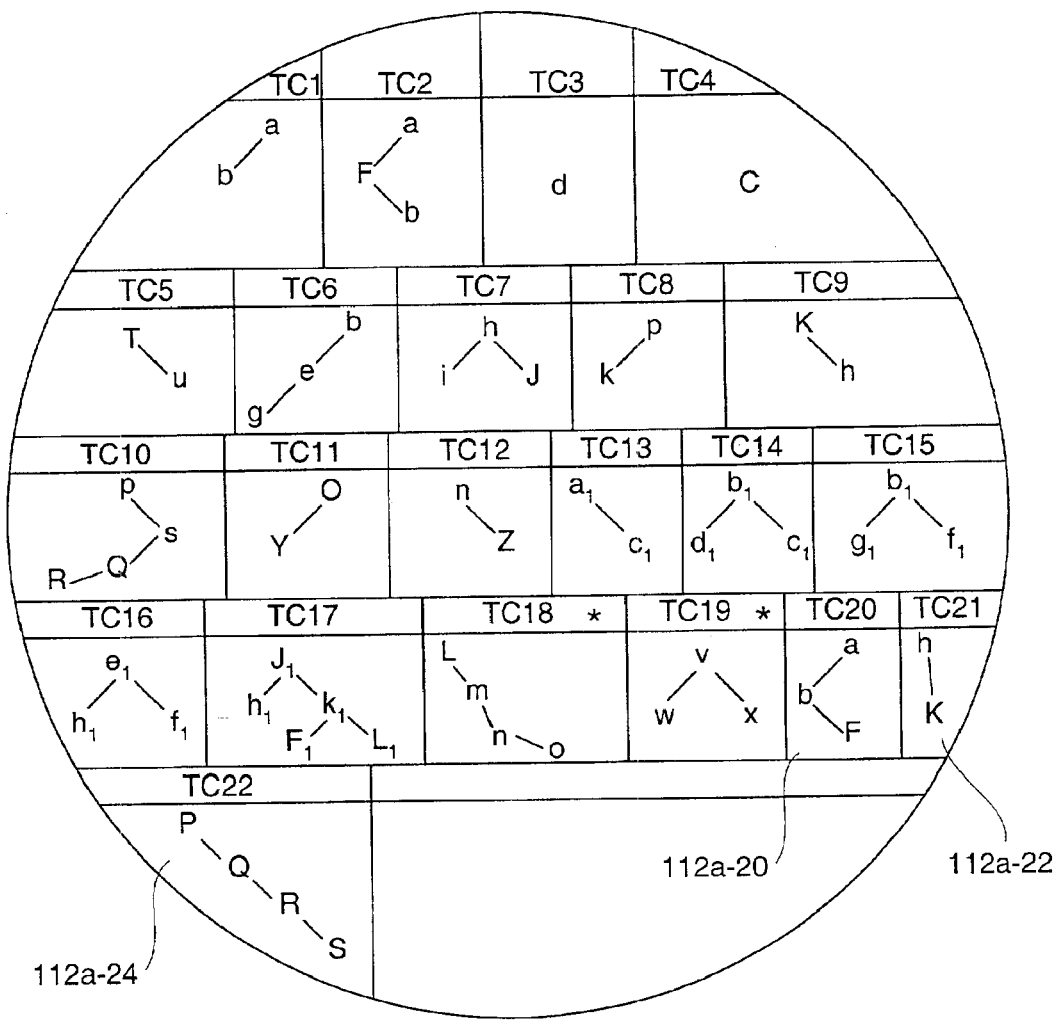
FIG. 8F depicts addition of a plurality of new test cases and test call trees designed to exactly traverse certain paths of the application data structure, in accordance to still another embodiment of the present invention.

Modifying the order of execution of the methods/functions of the test cases TC2, TC9, and TC10 so as to create the modified test cases TC20–TC22 has been illustrated in FIG. 8F, in accordance with one embodiment of the present invention. In the modified test cases TC20–TC22, the order of execution of the methods/functions of the TC2, TC9, and TC10, are modified so as to replicate the exact execution order of the application paths 112*b*-3, 112*b*-4, and 112*b*-5. In one example, the test data structures 112*b*-1, 112*b*-3 through 112*b*-8, 112*b*-11 through 112*b*-22 of the corresponding test cases TC1, TC3–TC8, TC11–TC22 are selected to run in the order of the application data structure 112*b* so as to exactly replicate the application data structure 112*b*. At this point, the test cases generating the exact replication of the application data structure are executed using the production Java VM 104. If the production Java VM 104 crashes, it becomes apparent that the production Java VM 104 is the source of the problem. The production Java VM 104 is fixed and updated and the customer is provided with a bug-free version of the production Java VM 104.

As an alternative, as the entire production Java VM 104 has been tested without producing any bugs, the production Java VM 104 developers have exhausted all possibilities in mimicking the behavior of the application executable 102 at the time of the crash. At this point, it is believed that the application executable or an external source (e.g., the server product 108, etc.) affecting the application executable may be the cause of the crash. For instance, the source of the crash may be discoverable in the production environment. As a result, the application executable is returned to the customer advising the customer of the potential problems with the application executable. By way of example, the cause of the crash may be associated with the server product 108 interfacing with the application 102, while the application 102 is executing the production Java VM 104, in the production environment.

Figure 9:
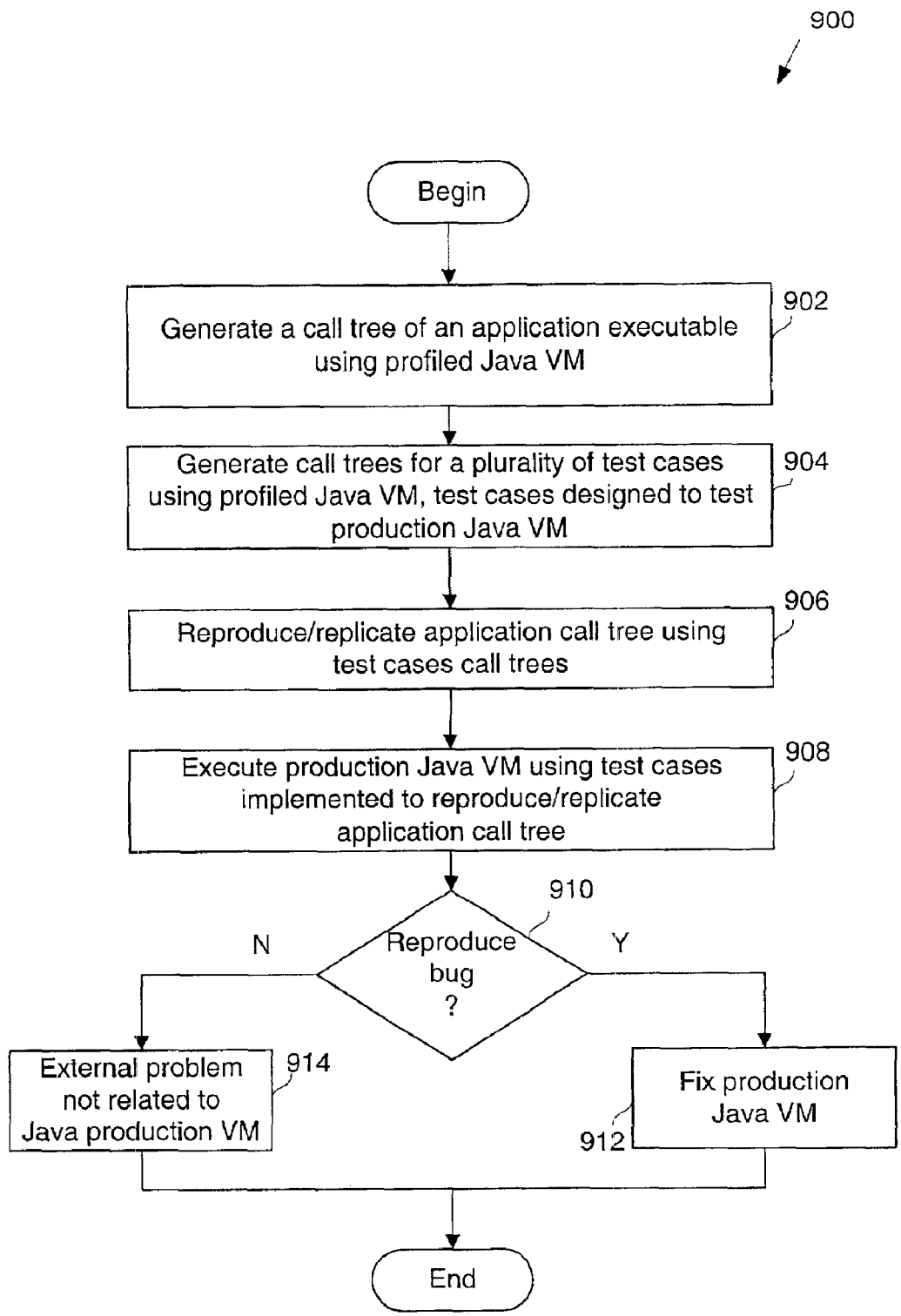
FIG. 9 is a flow chart diagram illustrating a method operations implemented in mimicking the behavior of the application executable using a plurality of test cases, in accordance with yet another embodiment of the present invention.

FIG. 9 depicts a flowchart 900 illustrating the method operations performed in mimicking the behavior of the application executable using a plurality of test cases, in accordance with one embodiment of the present invention. The method begins in operation 902 in which a call tree of an application executable is generated using profiled Java VM. Then, in operation 904, call trees for a plurality of test cases are generated using the profiled Java VM. The test cases are designed to test the production Java VM.

Continuing to operation 906, the application call tree is reproduced/replicated using the test case call trees. Then, in operation 908, production Java VM is executed using the test cases implemented to reproduce/replicate the application call tree. The method next moves to operation 910 in which a determination is made as to whether the bug has been reproduced (whether the application executable has crashed leading to the recognition of the source of the crash). If the bug has been reproduced, the method continues to operation 912 in which the production Java VM is fixed. Otherwise, the method continues to operation 914 in which it is determined that the bug is caused by an external problem not related to Java production VM.

Figure 10:
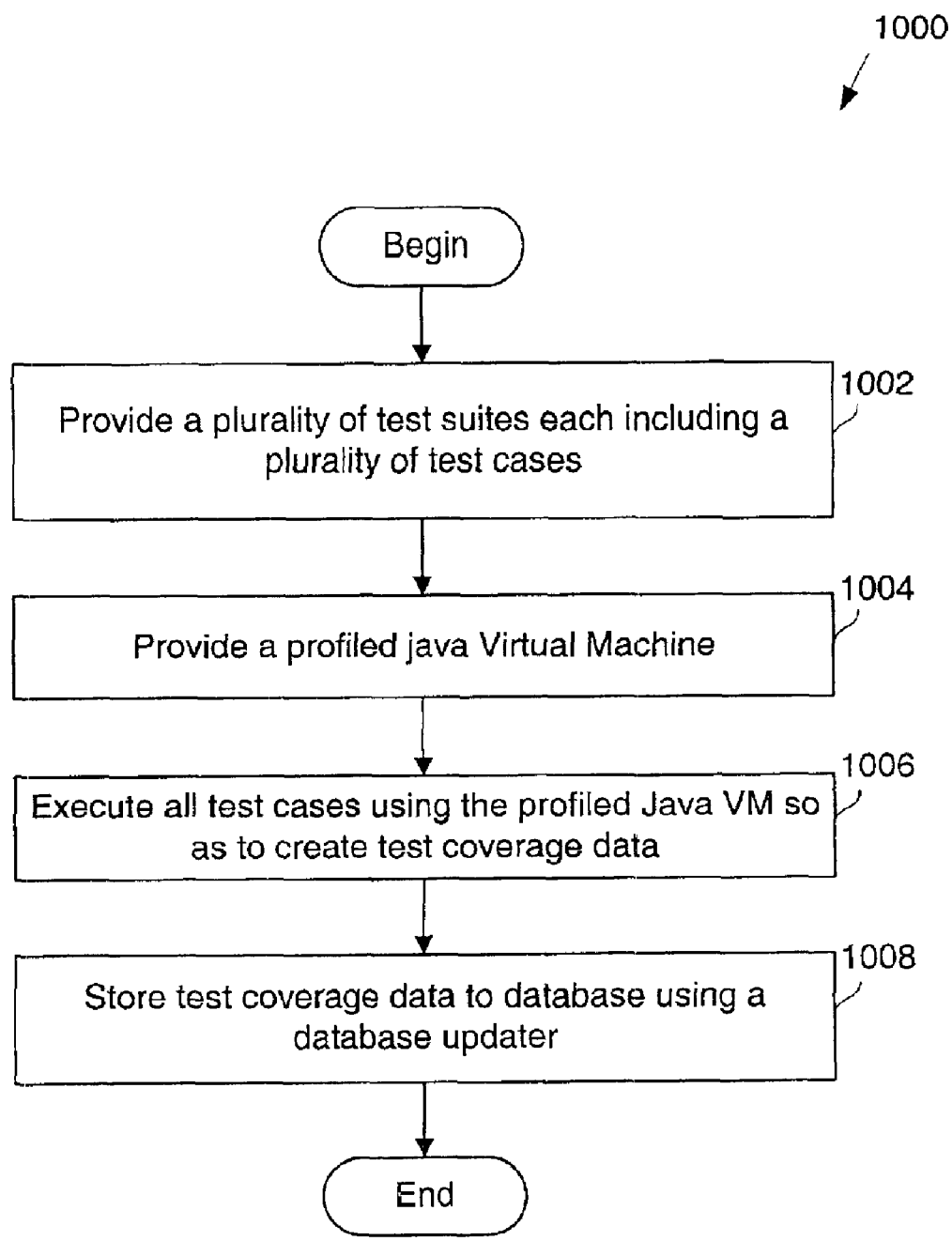
FIG. 10 is a flow chart diagram illustrating a method operations performed to collect test case call trees, in accordance with yet another embodiment of the present invention.

FIG. 10 depicts a flowchart 1000 illustrating the method operations performed to collect test case call trees, in accordance with one embodiment of the present invention. The method begins in operation 1002, in which a plurality of test suites each including a plurality of test cases are provided. Then, in operation 1004, a profiled Java VM is provided. Next, in operation 1006, all the test cases are executed using the profiled Java VM so as to create test coverage data. Continuing to operation 1008, the test coverage data is stored in a database using a database updater.

Figure 11:
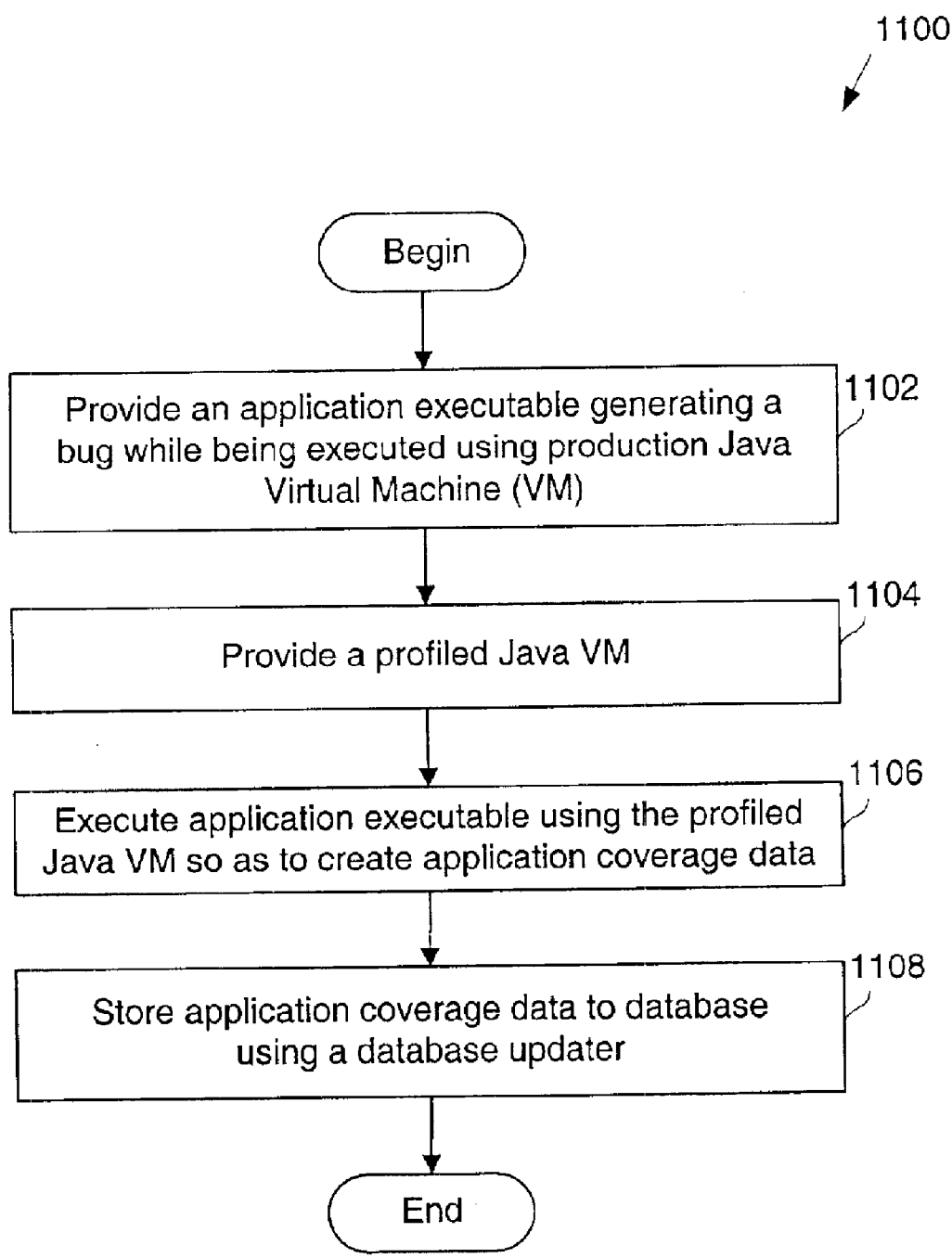
FIG. 11 is a flow chart diagram illustrating a method operations implemented to collect application data structures, in accordance with yet another embodiment of the present invention.

FIG. 11 depicts a flowchart 1100 illustrating the method operations performed to collect application data structures (i.e., application call tree) in accordance with one embodiment of the present invention. The method begins in operation 1102 in which an application executable generating a bug while being executed using the production Java VM is provided. Next, in operation 1104, a profiled Java VM is provided. Moving to operation 1106, the application executable is executed using the profiled Java VM so as to create application coverage data. Thereafter, in operation 1108, the application coverage data is stored in a database using a database updater.

Figure 12A:
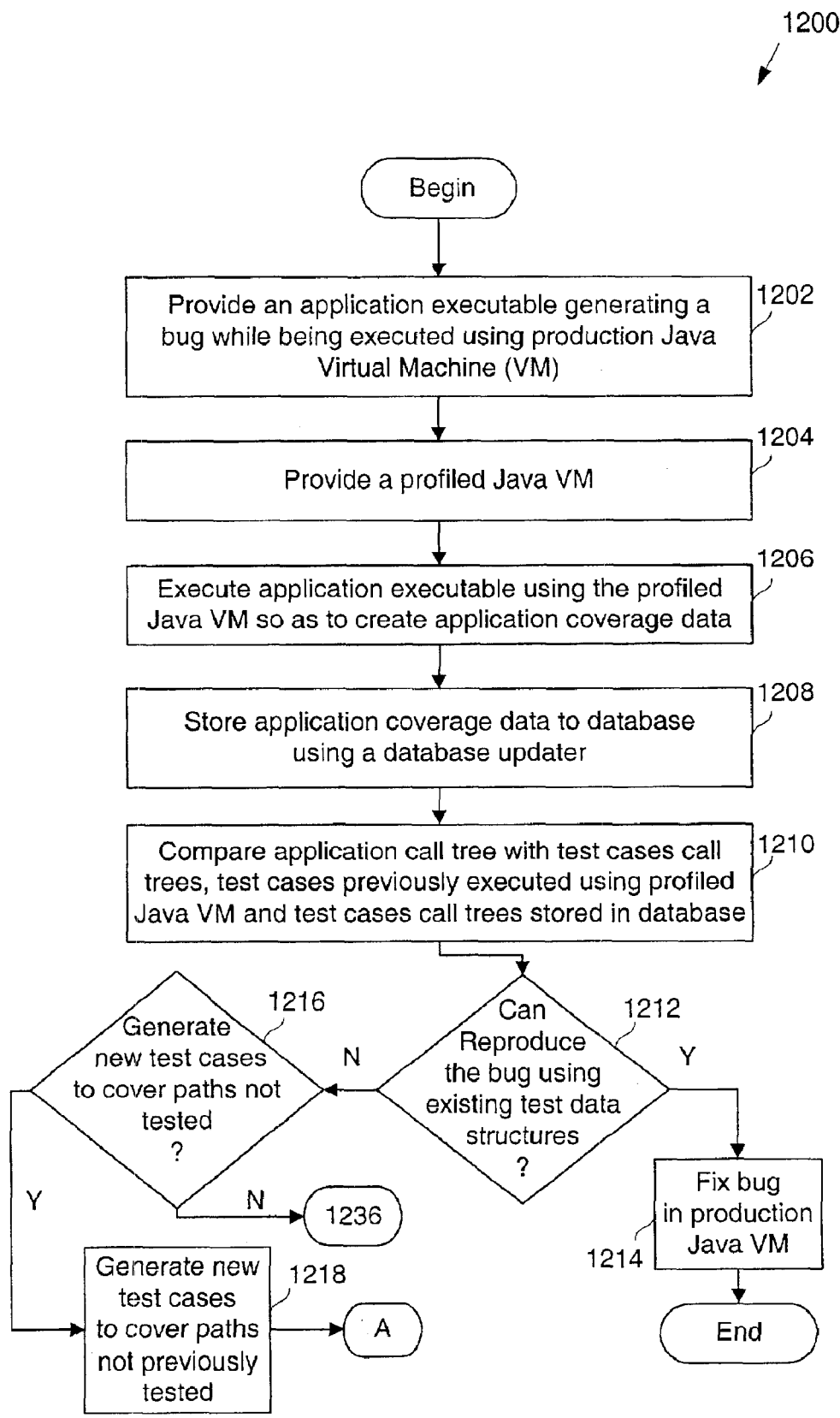
FIG. 12A is a flow chart diagram illustrating a method operations performed to determine a source of a crash when a third party application is executing production Java VM, in accordance with yet another embodiment of the present invention.
Figure 12B:
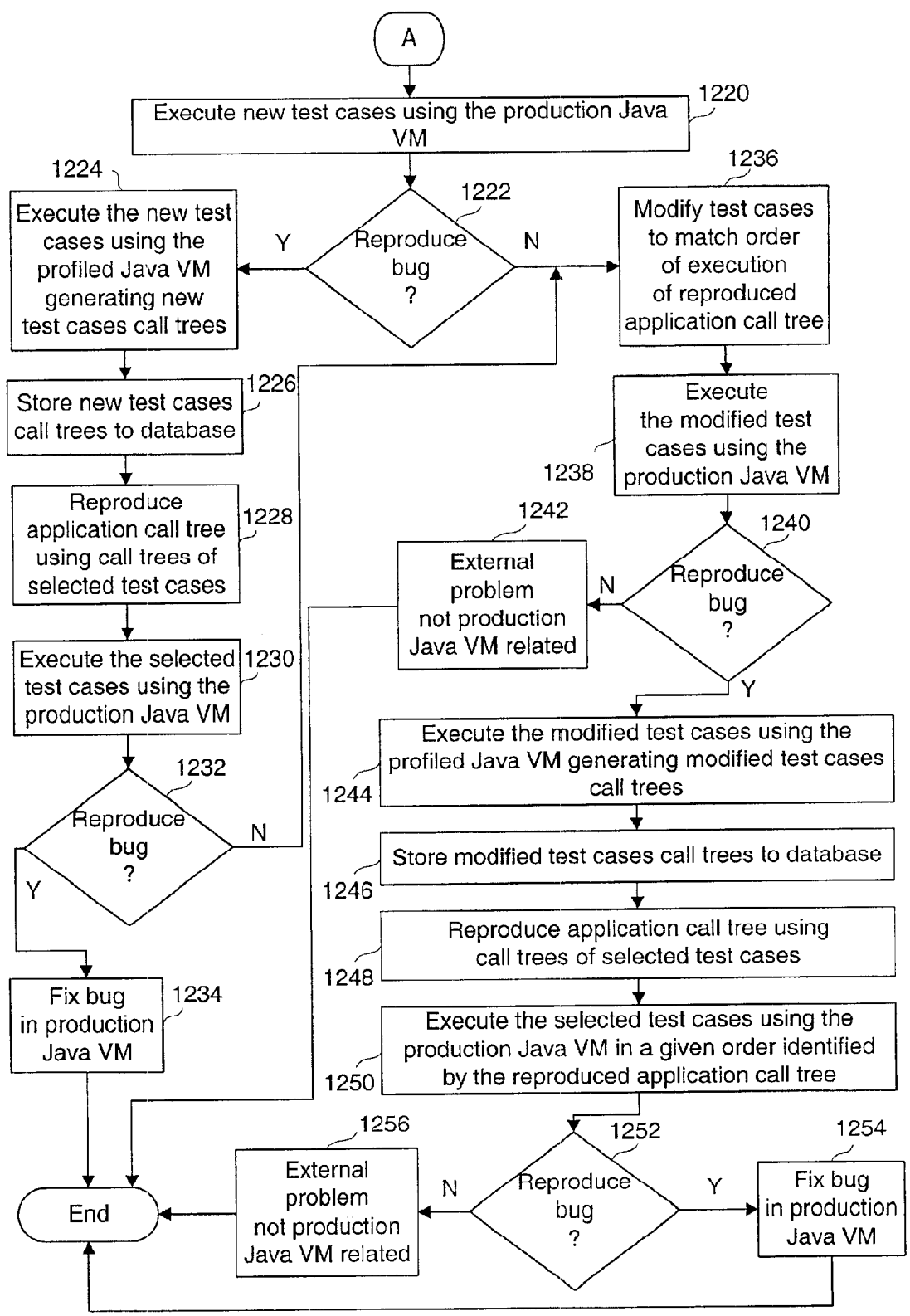
FIG. 12B is a flow chart diagram illustrating a method operations performed to determine a source of a crash when a third party application is executing production Java VM, in accordance with yet another embodiment of the present invention.

FIGS. 12A and 12B depict a flowchart 1200 illustrating a method operations performed to determine a source of a crash when a software application is being executed using the production Java VM, in accordance with one embodiment of the present invention. The method begins in operation 1202 in which an application executable generating a bug while being executed using the production Java VM is provided. Next, in operation 1204, a profiled Java VM is provided. Moving to operation 1206, the application executable is executed using the profiled Java VM so as to create application coverage data. Thereafter, in operation 1208, the application coverage data is stored in a database as application call tree using a database updater. In operation 1210, the application call tree and test case call trees are compared. The test cases were previously implemented to test production Java VM and test case call trees were previously stored in the database.

Continuing to operation 1212, a determination is made as to whether the bug can be reproduced using the existing test data structures. If the bug can be reproduced using the existing test data structures, the method continues to operation 1214, in which the bug is fixed in the production Java VM. However, if the bug cannot be reproduced using the existing test data structures, the method continues to operation 1216, in which a determination is made as to whether new test cases need to be generated to cover the application paths not previously tested by the existing test cases. If it is determined that new test cases need to be generated to cover certain paths in the application data structure that have not been previously tested, the method continues to "A". In the alternative, the method continues to operation 1236.

Following A, the method continues to operation 1220, in which the new test cases are executed using the production Java VM. Thereafter, in operation 1222, a determination is made as to whether the bug has been reproduced. If the bug has been reproduced, the method continues to operation 1224 in which the new test cases are executed using the profiled Java VM, generating new test case call trees. Then, in operation 1226, the new test case call trees are stored in the database. Moving to operation 1228, the application call tree is reproduced using the call trees of selected test cases. In one example, the call trees of the selected test cases traverse the paths of the application data structure. Then, in operation 1230, the selected test cases are executed using the production Java VM. Proceeding to operation 1232, a determination is made as to whether the bug has been reproduced. If the bug has been reproduced, the method continues to operation 1234 in which the bug is fixed in the production Java VM.

If in operation 1222 and 1232 a determination is made that the bug has not been reproduced, the method continues to operation 1236, in which the test cases are modified to match the order of execution of the reproduced application call tree. Thereafter, in operation 1238, the modified test cases are executed using the production Java VM. The method then continues to operation 1240 in which it is determined whether the bug has been reproduced. If the bug has not been reproduced, it is determined that the bug is caused by an external problem not related to the production Java VM.

However, if in operation 1240 it is determined that the bug has been reproduced, the method continues to operation 1244 in which the modified test cases are executed using the profiled Java VM, generating modified test case call trees. Then, in operation 1246, the modified test case call trees are stored in the database. Next, in operation 1248, the application call tree is reproduced using the call trees of the selected test cases. The method then continues to operation 1250, in which the selected test cases are executed using the production Java VM in a given order identified by the reproduced application call tree.

Continuing to operation 1252, a determination is made as to whether the bug has been reproduced. If the bug has been reproduced, in operation 1254, the bug is fixed in the production Java VM. However, if is determined that the bug has not been reproduced, it is determined that the bug is caused by an external problem not related to production Java VM.

The advantages of the present invention are numerous. Most importantly, the embodiments of the present invention identify any portion of a software application having the least amount of test coverage. In this manner, the software application developers are required to expend minimal effort in locating the sections of the application software not having been tested or have been tested insufficiently. Another advantage of the embodiment of the present invention is that certain repetitive bugs created during the execution of a software application using the Java production VM can be noted and stored in database. In this manner, when encountering a recognized error while executing the same software application using the production Java VM, a solution can be easily founds and forwarded to the customers, substantially reducing time expended by developers in eliminating the errors.

With the above embodiments in mind, it should be understood that, the invention may be practiced with other computer system configurations including handheld devices, microprocessor systems, microprocessor-based or programmable consumer electronics, minicomputers, mainframe computers and the like. Furthermore, the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a

What is claimed is:

1. A method for analyzing test coverage of a software application, the method comprising:

profiling an executable of the software application to generate application call tree;

profiling test cases used to test a production Java VM, the profiling of the test cases generating test case call trees; and comparing the application call trees with the test case call trees, the comparing configured to identify gaps in the application call tree not covered by the test case call trees.

2. A method for analyzing test coverage of a software application as recited in claim 1, the method further including, generating gap filling test cases to test the production Java VM; and executing the production Java VM using the gap filling test cases.

3. A method for analyzing test coverage of a software application as recited in claim 2, the method further including, profiling the gap filling test cases to generate new test case call trees, the new test case call trees being combined with existing test case call trees.

4. A method for determining a source of an error during an execution of a software application using Java production VM, the method comprising:

profiling an executable of the software application to generate application call trees;

profiling test cases used to test the production Java VM, the profiling of the test cases generating test case call trees; and comparing the application call trees with the test case call trees, the comparing configured to identify gaps in the application call trees not covered by the test case call trees;

reproducing the application call tree;

executing a reproduced application call tree using the production Java VM;

fixing the production Java VM so as to eliminate the error in the production Java VM if the error is generated during the execution of the reproduced software application using the production Java VM; and confirming that the bug is not generated by the production Java VM if the execution of the production software component by the reproduced data structure does not generate the bug to A method for determining a source of an error during an execution of a software application using a production Java VM, the method comprising:

profiling an executable of the software application to generate an application call tree;

profiling test cases used to test the production Java VM, the profiling of the test cases generating test case call trees;

and comparing the application call tree with the test case call trees, the comparing configured to identify gaps in the application call tree not covered by the test case call trees;

reproducing the application call tree;

executing the reproduced application call tree using the production Java VM;

fixing the production Java VM so as to eliminate the error in the production Java VM if the error is generated during the execution of a reproduced software application using the production Java VM;

and confirming that the bug is not generated by the production Java VM if the execution of the reproduced software application by the reproduced application call tree does not generate the bug.

5. A method for determining a source of an error during an execution of a software application using Java production VM as recited in claim 4, the method further including, identifying gaps in the application call tree not covered by the test case call trees.

6. A method for determining a source of an error during an execution of a software application using Java production VM as recited in claim 4, the method further including, generating gap filling test cases to test the production Java VM; and executing the production Java VM using the gap filling test cases.

7. A method for determining a source of an error during an execution of a software application using Java production VM as recited in claim 6, wherein if the execution of the production Java VM using the gap filling test cases causes a replication of an error, the method further includes, fixing the production Java VM.

8. A method for determining a source of an error during an execution of a software application using Java production VM as recited in claim 7, the method further including, executing the updated reproduced application call tree using production Java VM.

9. A method for determining a source of an error during an execution of a software application using Java production VM as recited in claim 6, the method further including, profiling the gap filling test cases to generate new test case call trees, the new test case call trees being combined with existing test case call trees.

10. A method for determining a source of an error during an execution of a software application using Java production VM as recited in claim 9, the method further including, modifying a test case so as to create a modified test case having a substantially identical call tree path as a portion of a path of an updated reproduced application call tree.

11. A method for determining a source of an error during an execution of a software application using Java production VM as recited in claim 10, the method further including, replicating the updated reproduced application call tree using selected one of the test case call trees, the new test case call trees, and modified test case call tree so as to create a replicated application call tree.

12. A method for determining a source of an error during an execution of a software application using Java production VM as recited in claim 6, the method further including, reproducing the application call tree using selected ones of the test case call trees and the new test case call trees so as to create an updated reproduced application call tree.

13. A system for analyzing test coverage of a software application, the system comprising:
   a production Java virtual machine (VM);
   a profiled Java VM;
   a plurality of test cases used to test the production Java VM, the plurality of test cases executed using the profiled Java VM so as to generate test coverage data;
   a software application executable configured to be executed using the production Java VM, the application executable configured to be executed using the profiled Java VM so as to generate an application coverage data;
   a database to store the test coverage data and the application coverage data;
   a compare module configured to compare the test coverage data against the application coverage data so as to locate a gap in the application coverage data.

14. A system for analyzing test coverage of a software application as recited in claim 13, wherein a new test case is generated if the compare module locates a gap in the application coverage data.

15. A system for analyzing test coverage of a software application as recited in claim 14, wherein the new test case is executed using the profiled Java VM so as to generate a new test coverage data.

16. A method for determining a source of a bug generated while a software application is executed using a production Java VM, the method comprising:
   providing a production Java VM;
   providing a profiled Java VM;
   providing a plurality of test cases configured to be executed using the production Java VM;
   receiving an application executable;
   executing the test cases using the profiled Java VM so as to generate test coverage data;
   storing test coverage data in a database;
   executing the application executable using the profiled Java VM so as to generate an application coverage data;
   storing the application coverage data in the database;
   using test coverage data to reproduce the application coverage data;
   executing a reproduced application coverage data using the production Java VM;
   updating the production Java VM so as to eliminate the bug in the production Java VM, if the bug is generated while executing the test cases generating the reproduced application coverage data using the production Java VM; and
   confirming that the production Java VM does not generate the bug, if the execution of the production Java VM by the test cases generating the reproduced application coverage data does not generate the bug.

17. A method as recited in claim 16, wherein using the test case coverage data to reproduce the application coverage data, includes,
   determining whether the application coverage data can be copied using the test case coverage data.

18. A method as recited in claim 17, wherein determining whether the application coverage data can be copied using the test case coverage data, includes generating a new test case to traverse a gap in the application coverage data, if a gap in the coverage data exists.

19. A method as recited in claim 18, further comprising:
   executing the new test case using the profiled Java VM so as to generate a new test coverage data; and
   storing the new test coverage data in the database.

20. A method as recited in claim 19, further comprising,
   selecting a plurality of test cases from the existing test cases and the new test cases so as to reproduce the application coverage data.

21. A method as recited in claim 20, further comprising,
   modifying a test case so as to arrive at a modified test case, the modified test case traversing a test path substantially identical to a portion of the application coverage data;
   generating a modified coverage data; and
   replicating the application coverage data using selected ones of a plurality of test cases from the existing test cases, new test cases, and the modified test cases.

22. A method as recited in claim 16, wherein the application coverage data is compared against the test coverage data to determine whether a gap exists in the application coverage data.

23. A method for analyzing a test coverage of a software application being executed using a production Java VM, the method comprising:
   providing a profiled Java VM;
   providing a plurality of test cases being executed using the production Java VM;
   providing an application executable;
   executing the test cases using the profiled Java VM so as to generate test coverage data;
   storing test coverage data in a database in a call tree format;
   executing the application executable using the profiled Java VM so as to generate an application coverage data;
   storing the application coverage data in the database in the call tree format;
   comparing an application call tree with the test call trees; and
   locating a path in the application call tree not having been traversed by the test call trees so as to provide coverage for all paths in the application call tree.

24. A method as recited in claim 23, further comprising, generating a new test case to test the path not traversed by the test case call trees.

25. A method as recited in claim 24, further comprising,
   executing the new test case using the profiled Java VM so as to generate a new test call tree; and
   store the new test call tree in the database.

26. A method as recited in claim 23, further comprising,
   executing the new test case using the production Java VM.

27. A method as recited in claim 23, further comprising,
   fixing the production Java VM if a bug is found during an execution of the new test case using the production Java VM.

* * * * *